United States Patent [19]

Kornhauser

[11] 4,099,759

[45] * Jul. 11, 1978

[54] ENERGY ABSORBING BUMPER SYSTEM

[75] Inventor: Murray Kornhauser, Wynnewood, Pa.

[73] Assignee: Safety Consultants, Berwyn, Pa.

[*] Notice: The portion of the term of this patent subsequent to Jul. 27, 1993, has been disclaimed.

[21] Appl. No.: 745,419

[22] Filed: Nov. 26, 1976

Related U.S. Application Data

[63] Continuation of Ser. No. 687,513, May 18, 1976, which is a continuation of Ser. No. 430,667, Jan. 4, 1974, Pat. No. 3,971,583, which is a continuation-in-part of Ser. No. 126,155, Mar. 19, 1971, Pat. No. 3,810,668.

[51] Int. Cl.² .............................................. B60R 19/10
[52] U.S. Cl. .................................. 293/71 P; 293/63; 267/116
[58] Field of Search ...................... 293/1, 60, 63, 71 R, 293/71 P, 88, 98, DIGS. 1-3; 267/116, 139, 140; 188/282; 114/219; 152/379 R

[56] References Cited

U.S. PATENT DOCUMENTS

| | | | |
|---|---|---|---|
| 1,172,001 | 2/1916 | Baker et al. | 293/71 P |
| 1,373,822 | 4/1921 | Kleine | 293/DIG. 2 X |
| 1,580,203 | 4/1926 | Jasheway et al. | 293/71 P |
| 1,709,493 | 4/1929 | Shoemaker | 293/71 P |
| 2,731,290 | 1/1956 | Corydon | 293/71 P |
| 3,588,159 | 6/1971 | Duckett et al. | 293/1 |
| 3,656,790 | 4/1972 | Truesdell | 293/71 P |
| 3,768,850 | 10/1973 | Barton et al. | 293/71 P |
| 3,827,741 | 8/1974 | Howell et al. | 152/379 R |
| 3,877,503 | 4/1975 | Tangorra et al. | 152/379 R |
| 3,971,583 | 7/1976 | Kornhauser | 267/116 X |

FOREIGN PATENT DOCUMENTS

| | | | |
|---|---|---|---|
| 1,035,216 | 8/1953 | France | 293/71 P |
| 1,202,475 | 7/1959 | France | 188/282 |

Primary Examiner—Robert W. Saifer
Attorney, Agent, or Firm—Morton C. Jacobs

[57] ABSTRACT

An energy absorbing bumper system for protection of moving vehicles. The system comprises a flexible section and a rigid section, each containing compressed air, and an orifice passage or valve for controlling the flow of air between the flexible section and the rigid section. The flexible section is contoured for a generally flat impact surface to provide efficient operation and compact size, and to yield an aesthetically pleasing shape, and is held in shape by dividing the flexible section or bag into a large number of compartments lying adjacent to each other along the direction of the surface to be protected, and by introducing compressed air into each compartment. Each one of the compartments of the bag is connected to the rigid section by means of an orifice, or by a relief valve.

20 Claims, 24 Drawing Figures

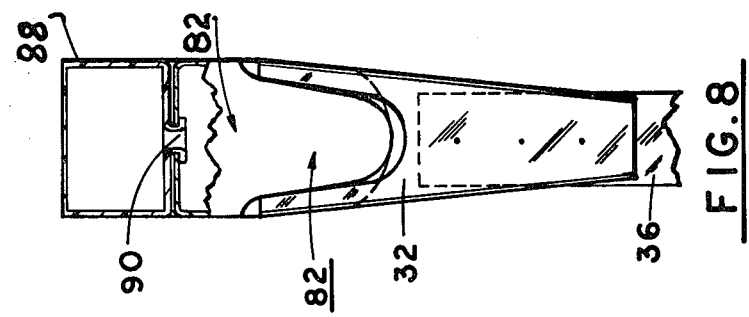
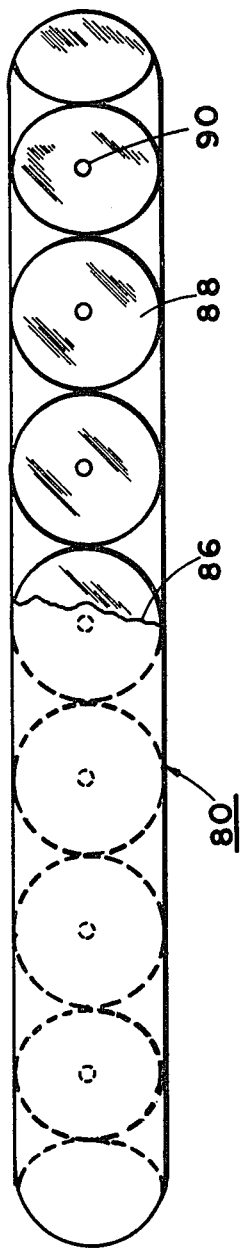
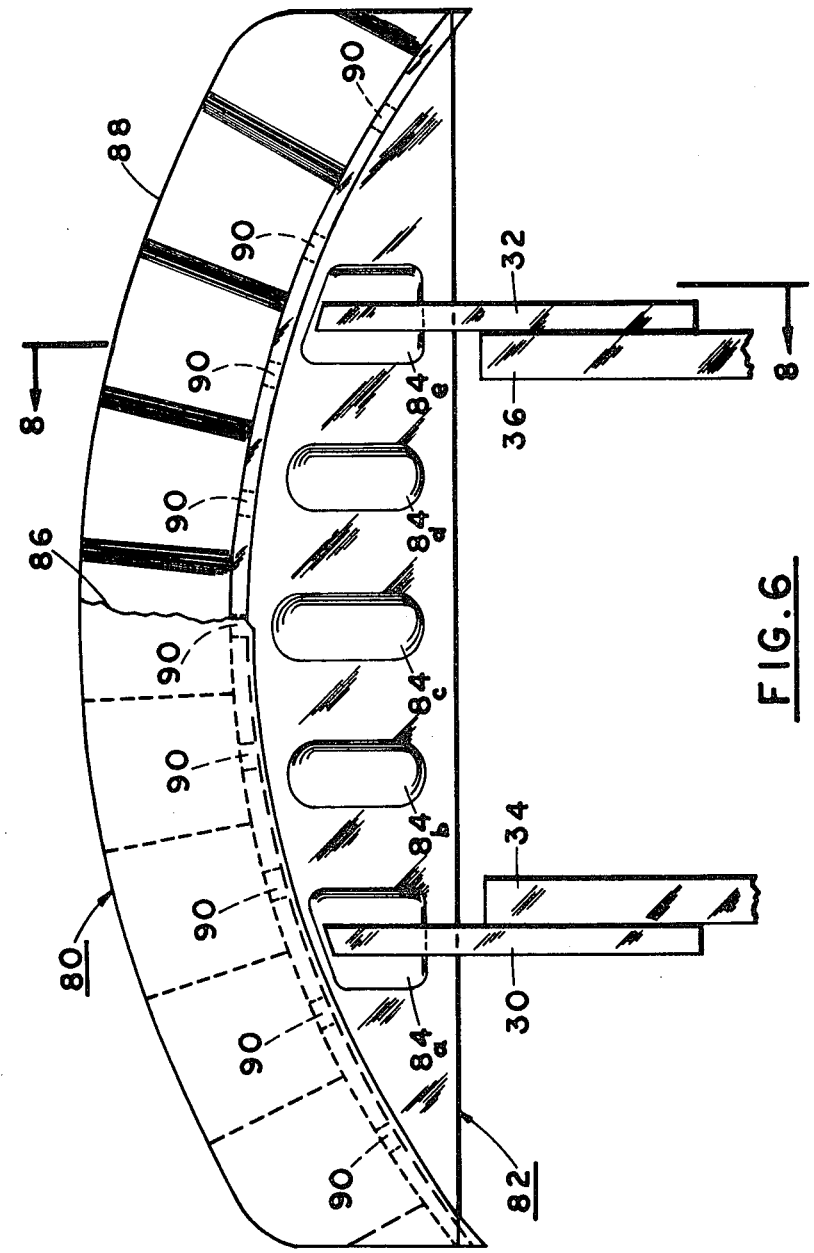

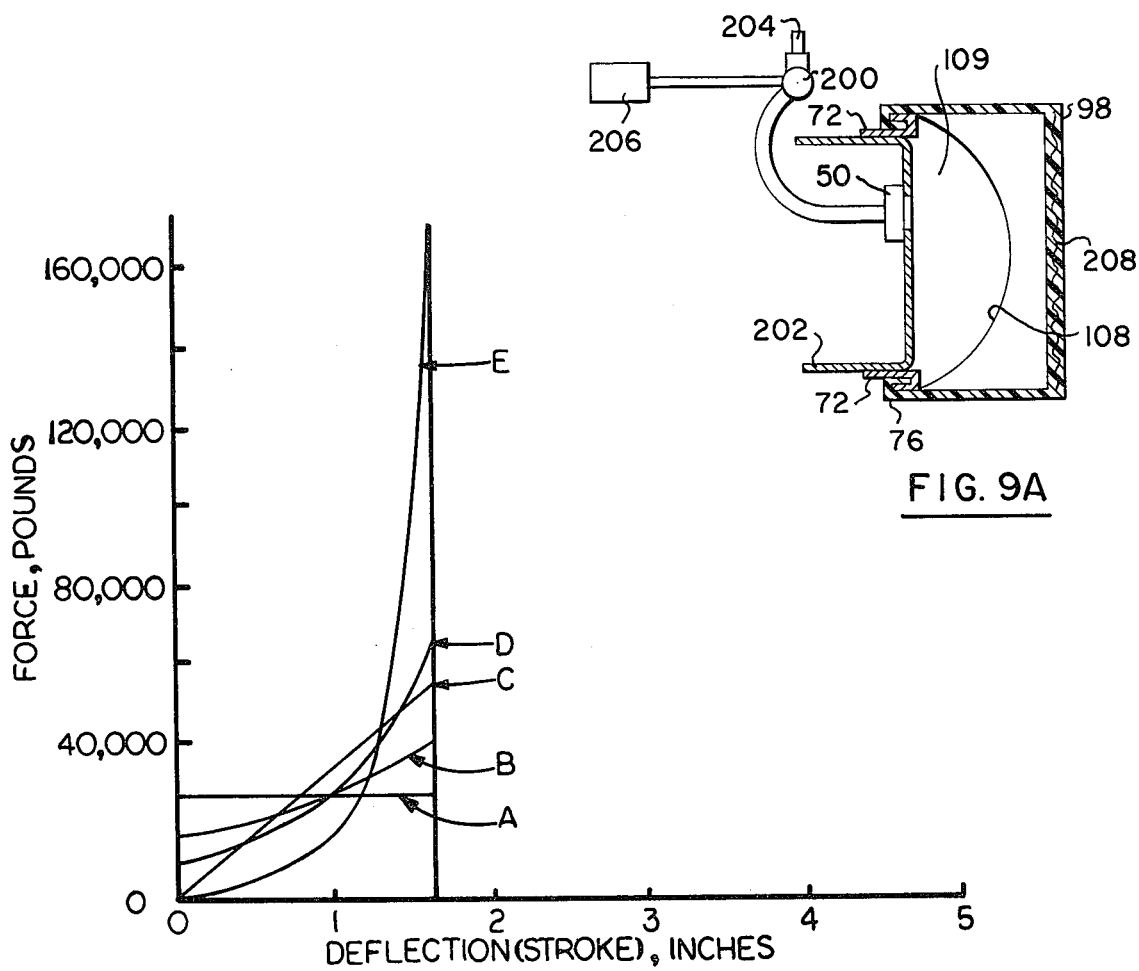
FIG. 9A
Fig.12a
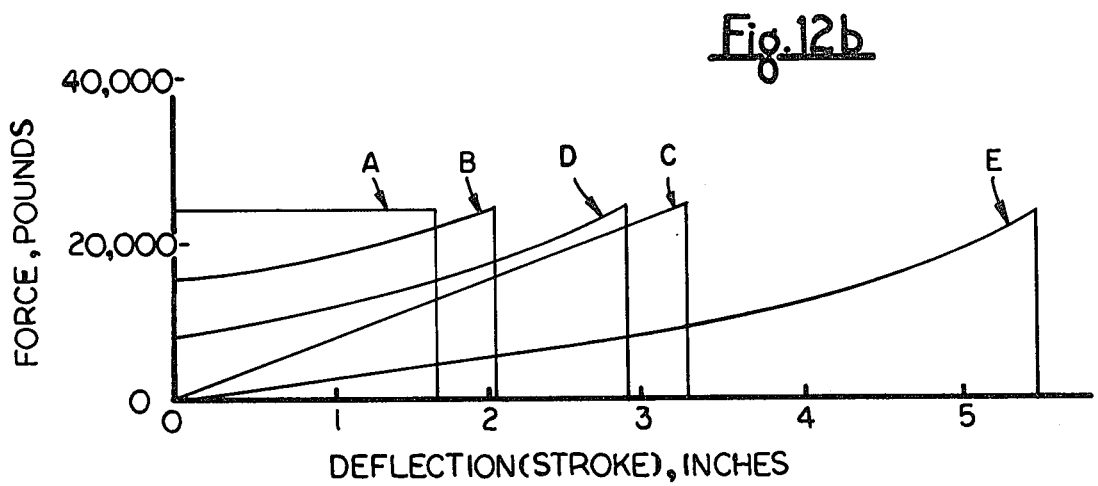
Fig.12b

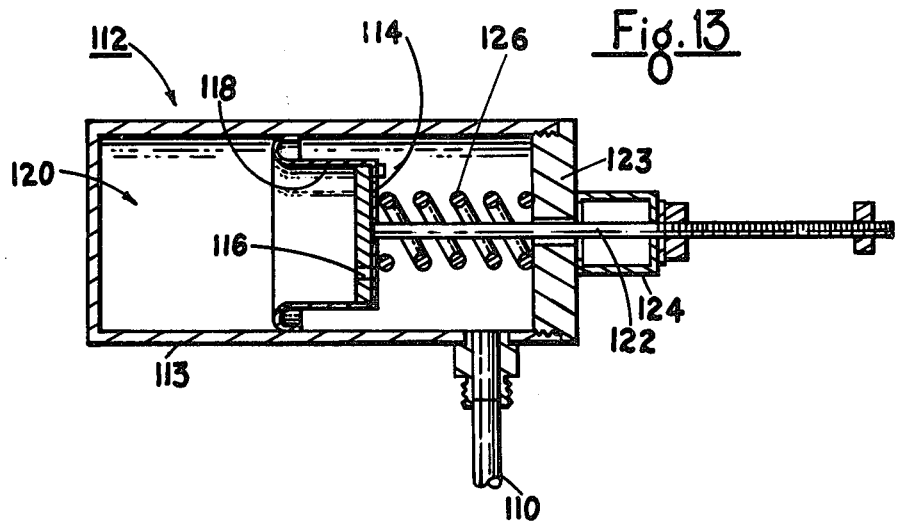
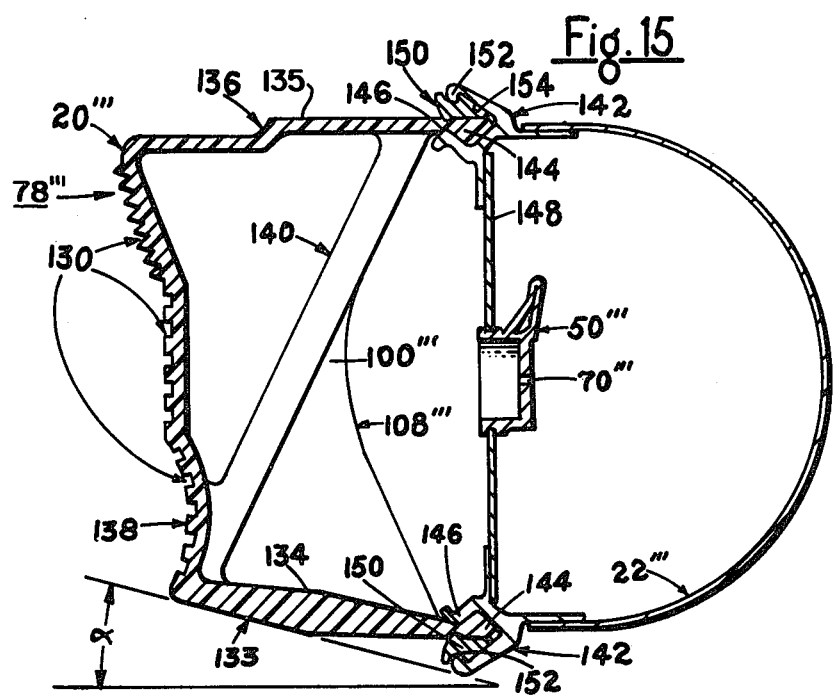
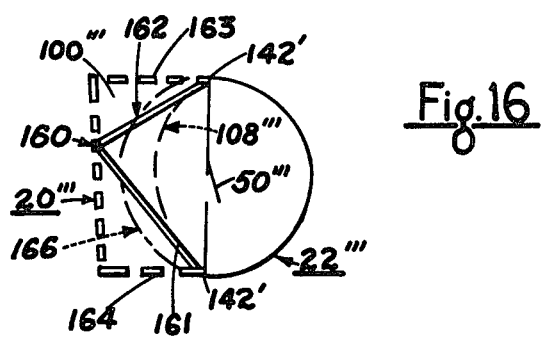

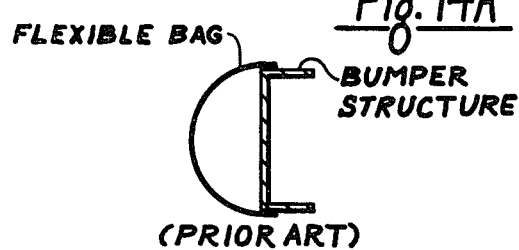
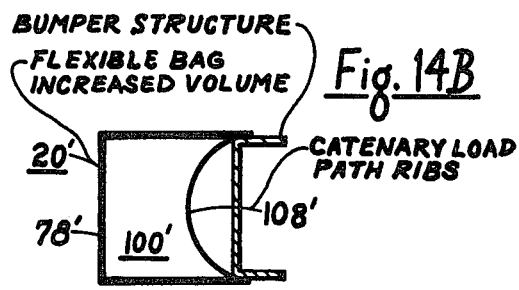
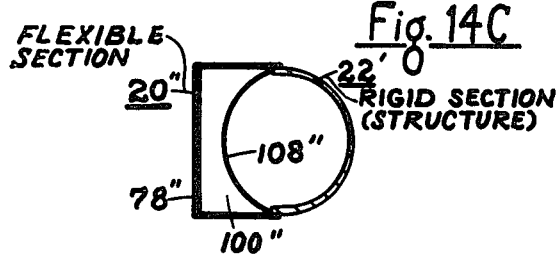
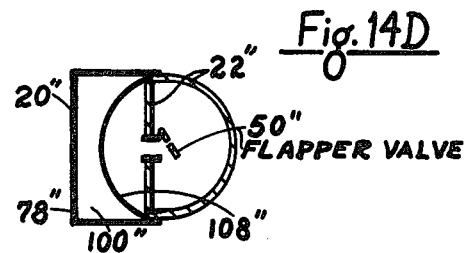
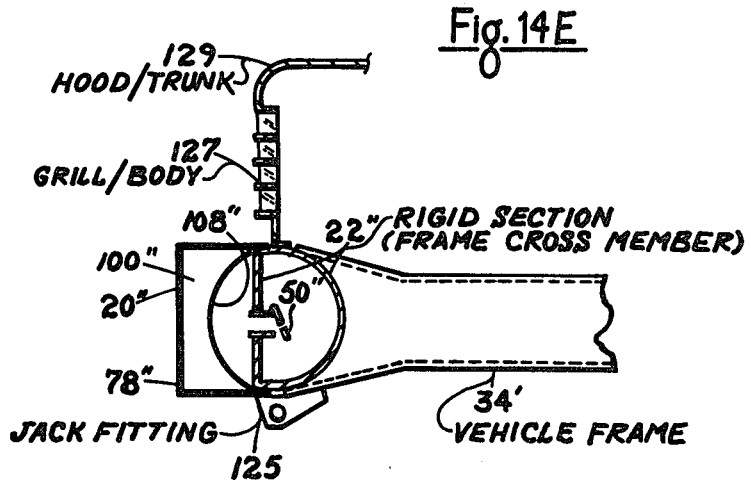

ENERGY ABSORBING BUMPER SYSTEM

BACKGROUND OF THE INVENTION

This application is a continuation of Ser. No. 687,513, filed May 18, 1976, which is a continuation of Ser. No. 430,667, filed Jan. 4, 1974, Now U.S. Pat. No. 3,971,583 issued July 27, 1976, which is a continuation-in-part of copending application Ser. No. 126,155, filed Mar. 19, 1971, now U.S. Pat. No. 3,810,668, issued May 14, 1974, for "Energy Absorbing Bumper System."

This invention relates to an energy-absorbing bumper system for protection of vehicles and passengers.

A large proportion of motor vehicle accidents occur at low speeds, e.g., less than 10 miles per hour (mph). These low speed accidents cause a major proportion of the total property damage which results from all motor vehicle accidents. Consequently, various federal and state agencies are becoming active in efforts to minimize this damage. The National Highway Traffic Safety Administration is currently promulgating rules that may require protection of automobile safety related components such as lights, hoods, trunk and door latches, fuel, cooling and exhaust systems, during low speed collisions. Other governmental proposals indicate that motor vehicles may be required to be equipped with bumpers that prevent damage during collisions at speeds of less than 5 to 10 mph. In addition to minimizing property damage, improved bumper systems can also minimize injuries to pedestrians and to passengers of vehicles involved in collisions. Accordingly, a considerable effort has been undertaken by both governmental bodies and the automobile industry to minimize damage to both property and persons caused by low speed collisions, since they represent a large percentage of the accidents and of the associated economic losses.

The National Highway Traffic Safety Administration is also promulgating safety rules in regard to deployment of safety devices (such as air bags, nets, padded blankets, or other soft media) for cushioning the passengers inside the car, in the event of potentially dangerous crashes at impact velocities of 10–30 mph or greater. In the development of this invention, it was recognized that the bumper system could be used to sense the impact velocity of the vehicle and to trigger or otherwise operate such safety devices.

Prior art bumpers which have attempted to improve upon the performance of the conventional automobile bumpers have not come into popular use because of disadvantageous characteristics they have exhibited. Some prior art bumpers have operated on energy storing rather than energy absorbing principles. The former systems store the energy of impact and then, immediately after impact, return it to the motor vehicle. Because of the immediate return of energy, those systems behave like springs and thereby produce a potentially dangerous rebound. A vehicle having such a system may strike a vehicle ahead of it and then rebound and strike another closely following vehicle or be propelled at an angle into the path of opposing traffic, thereby resulting in an even more serious accident. Some prior art systems have sought to minimize rebound by providing an energy-absorbing rather than an energy-storing device. However, where those systems have not provided immediate resetting of the energy absorbing device, the vehicle cannot be protected against repeated shocks as in a chain collision. Other prior art systems, such as pneumatic bumpers, have suffered from lack of effectiveness as well as from both cost and cosmetic disadvantages. They have not been sufficiently adaptable to the great variety of sizes and styles of motor vehicles, nor have they provided the ease of style variation that is prominent in the manufacture of automobiles.

SUMMARY OF THE INVENTION

Accordingly, it is an object of this invention to provide an improved bumper system.

Another object is to provide a bumper system which tends to reduce damage to property and to people during low-speed collisions.

Another object is to provide a bumper system of sufficient design flexibility to be adaptable to provide bumpers which afford protection during high-speed collisions.

Another object is to provide a bumper system which reduces harmful rebound.

Another object is to provide a bumper system which is quickly and automatically reset to its impact-ready condition after a collision.

Another object is to provide a bumper system which is practical and economically suitable to fabricate and install on motor vehicles.

Another object is to provide a bumper system which is compact and light in weight.

Another object is to provide a bumper system which can be made ornamental.

Another object is to provide a bumper system of sufficient design flexibility to be adaptable to a great variety of vehicle sizes and shapes.

Another object is to provide a new and improved pneumatic bumper.

Another object is to provide a pneumatic impact velocity sensor.

Another object is to provide means for sensing pneumatic pressure increases and the rate of pressure increase in the bumper system, for purposes of triggering, actuating or inflating safety devices in the passenger compartment of the vehicle.

In accordance with some forms of this invention, a bumper system is provided which includes a container formed in two sections, one a rigid section and the other a flexible section having an impact wall. The two sections are interconnected for controlled air passage from the flexible impact section to the rigid section upon impact, and back to the impact section after impact. The impact section is generally enclosed, in one form, by the flexible impact wall and the adjacent wall of the rigid section; in another form, the impact section is a substantially fully enclosed flexible bag. The rigid section, in different forms, is a rigid tank and a flexible-walled container. The impact section, in certain embodiments, is formed in compartments, which contributes to improved operation and maintenance, and each compartment may in turn be formed into sub-compartments. Thereby, a considerable amount of flexibility is afforded in ornamental design of bumper shapes. In addition, with this and other constructions, a substantially flat impact surface is achieved and a substantially rectangular impact force-versus-deflection characteristic. The pneumatic bumper system of this invention makes is possible to reliably sense impact velocity for controlling the operation of auxiliary safety equipment and to furnish a source of pressurized air for emergency use in such equipment.

BRIEF DESCRIPTION OF THE DRAWING

The foregoing and other objects of this invention, the various features thereof, as well as the invention itself, may be more readily understood from the following description when read together with the accompanying drawing, in which:

FIG. 6 is a plan view of an alternative embodiment of the invention;

FIG. 7 is a front view of the embodiment shown in FIG. 6;

FIG. 8 is a sectional view of the bumper of FIG. 6;

FIG. 9A is a modified form of the invention;

FIGS. 12a and b are idealized diagrams of a load-stroke characteristic used to explain features of this invention;

FIG. 13 is a schematic diagram of an impact velocity sensor which may be used with the safety system of FIG. 3;

FIG. 14a is a vertical cross-sectional view in schematic form of a prior art form of pneumatic bumper;

FIGS. 14b to e are similar views of different forms of this invention;

FIG. 15 is a vertical cross-sectional view of another embodiment of this invention; and FIG. 16 is a schematic diagram of the bumper of FIG. 15 in vertical cross-sectional view.

DESCRIPTION OF A PREFERRED EMBODIMENT

Figure 2:
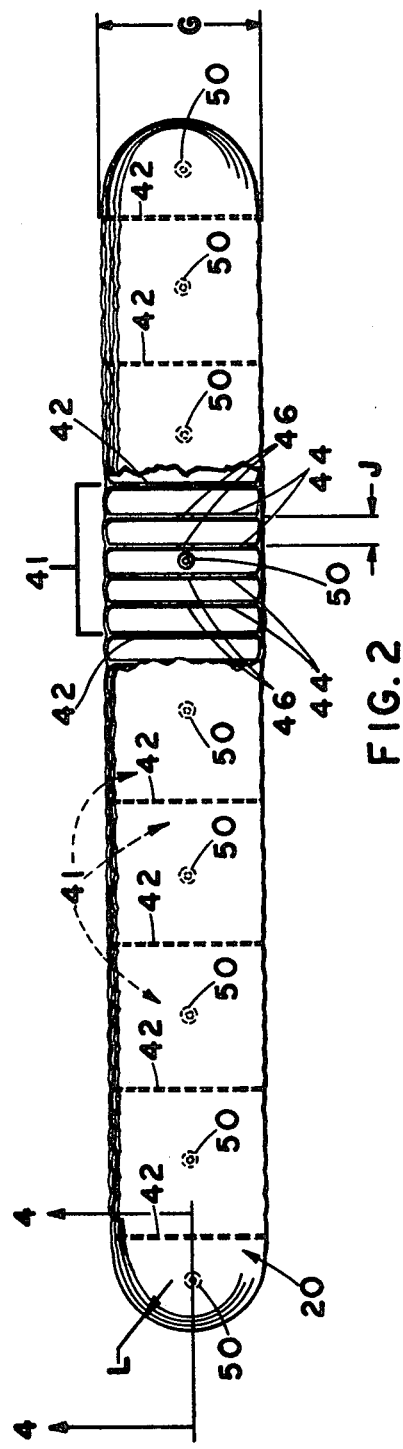
FIG. 2 is a front view of the bumper of FIG. 1.

In the bumper system shown in FIGS. 1-4, the bumper 15 comprises a flexible hollow impact cushion or bag 20 which contains pressurized air. Impact bag 20 may be fabricated of rubberized fabric, plastic coated fabric, molded plastic, or a lightweight wire mesh impregnated with plastic or rubber. The latter fabrication will provide special protection against abrasion and cutting. Impact bag 20 is mounted on an approximately cylindrically shaped air-tight rigid section 22. Rigid section 22 is constructed of a thin gauge metal, such as a thin sheet metal (e.g. 19 gauge) used for ordinary automobile bodies and fenders, so that it can be fabricated at low cost. This rigid portion of the bumper has a generally cylindrical shape and has attached thereto a front-surface support bracket 24 shaped to follow the contour of bag 20 and to provide maximum support thereto. Dome-shaped end caps 26 and 28 are welded into the cylinder to provide an air-tight container. The rigid section thus formed has a volume approximately equal to and preferably greater than that of the bag.

Figure 3:
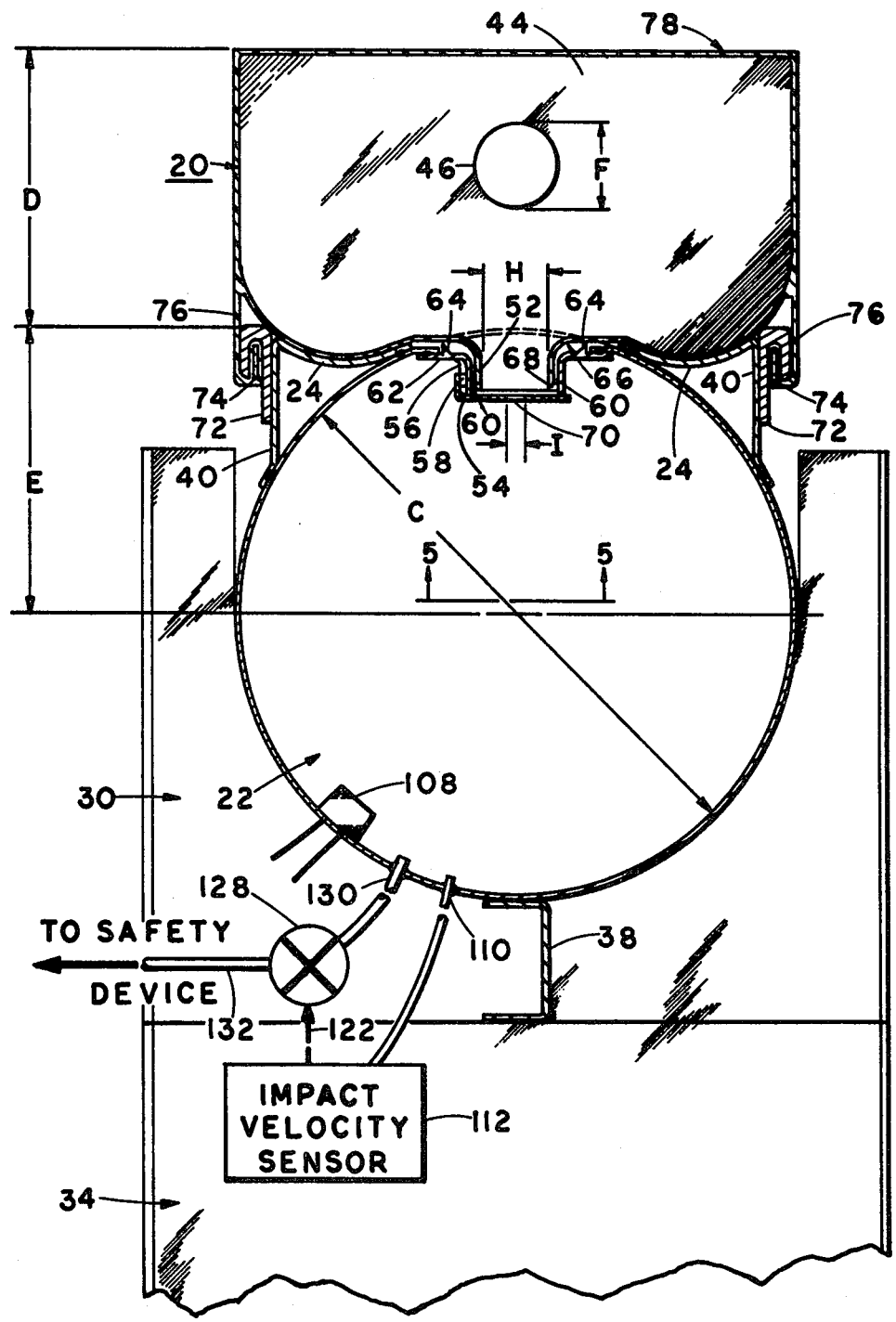
FIG. 3 is a sectional view of the bumper of FIG. 1.

Support brackets 30 and 32 which are formed in a yoke shape are fastened to and embrace the back and sides of the rigid section so as to mount and fasten the bumper to the vehicle main frame members 34 and 36, respectively, by means of a load tie 38, which is a channel shaped metallic member that extends along most of the back side of the rigid section and laterally between the frame members to which it is attached. Bracket 24 has a generally flat forward surface with dishing cross-sectional curvature (as indicated in FIG. 3) and with spaced apertures therein as noted hereinafter. In addition, bracket 24 has bent-back flanges 40, and the latter are fastened (e.g. welded) to the rigid section, as is the forward surface at its tangent tines. The bracket flanges 40 have free ends at each end of the rigid section, and are used for securing the flexible impact bag 20 to the rigid section.

The length of impact bag 20 is divided into several (e.g. nine) separate compartments 41 by transverse webs 42 that extend internally across the inside of the bag and are bonded thereto around the entire inner periphery thereof. Each separate compartment is further divided into subcompartments 43 by several contour support webs 44. For clarity, contour support webs are shown only in the cutaway portion of one compartment 41 of FIGS. 1 and 2. However, each such compartment formed by the webs 42 is subdivided by contour support webs similar to those shown. The purpose of the contour support webs is to give structural support to the exterior surface (and particularly the front face) of the impact bag so as to shape it in the desired contour. By means of these contour webs, the impact bag is shaped for optimum operational characteristics and sizing, as well as for ornamental appearance. Each contour web 44 has a hole 46 therethrough, to allow relatively free passage of air between subcompartments, whereby each compartment functions as a unit pneumatically. The structure heretofore described is shown more clearly in FIG. 3, which is an enlarged view of Section 3—3 of FIG. 1, and in FIG. 4, which is an enlarged view of Section 4—4 of FIG. 2.

Figure 4:
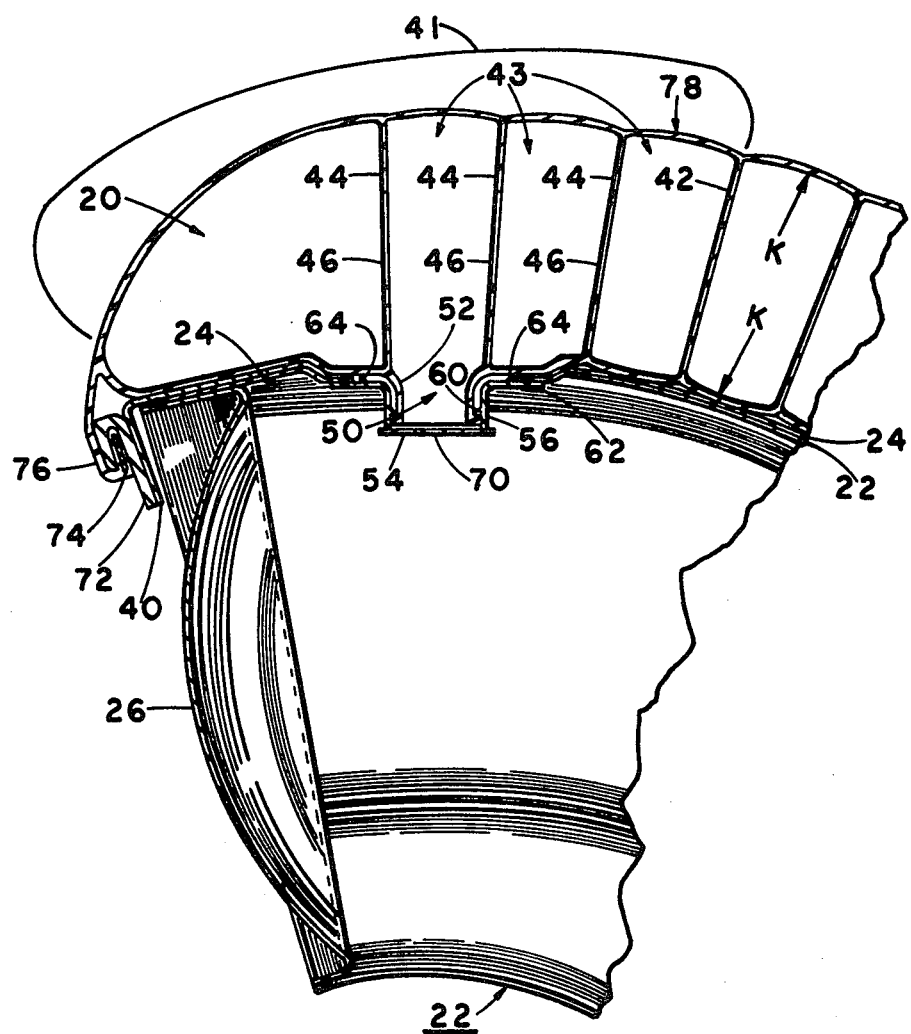
FIG. 4 is a sectional view of the bumper shown in FIG. 2.
Figure 5:
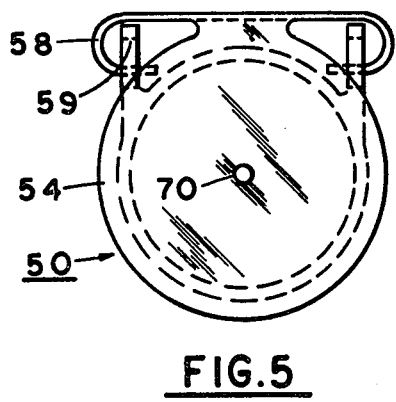
FIG. 5 is a plan view of the flapper check valve as seen along the line 5—5 of FIG. 3.

Each compartment 41 of impact bag 20 is connected to rigid section 22 by a port 52 fitted with a check and orifice bleed valve 50 (FIGS. 2-5). Any check valve which is normally closed by gravity and/or a spring or the equivalent may be used. The detailed structure of a preferred form of valve is shown in FIGS. 3-5. The valve 50 may be formed of metal or a rigid plastic which surrounds and retains inside the rigid section the flexible neck of port 52. The exit of the valve (or alternatively the neck of the port) is covered by a hinged, stiff flapper member 54 which normally closes the valve under gravity, but can be opened under internal pressure created upon impact in bag 20. Flapper 54 is pivotally connected to the neck portion 56 of the valve 50 by a hinge hook 58 which pivots in an elongated slot 59 in the neck 56 for opening and closing; the slot makes it possible for the flapper to pivot and to seat readily without a precision fabrication.

A sharp internal ridge 60 is formed around the neck portion 56 of the valve, and a second sharp internal ridge 64 is formed about the attachment flange 62 of the valve (which flange is fastened and sealed to the inside rim of a valve hole in rigid section 22). The space 66 between the ridges 62 and 64 and between the port 52 and valve 50 is vented by small passages (not shown) to ambient pressure, so that internal pressure in the flexible bag in the region of space 66 seals the bag surface to the valve. A bead 68 at the mouth of the port 52 is retained in position by the sharp ridge 60 and serves to position the port 52 during assembly. Flapper 54 has a small bleeder orifice 70 to allow equalization of air pressure in flexible section 20 and rigid section 22 when valve 50 is closed.

Impact bag 20 can be installed on rigid section 22 without use of fasteners, thereby enabling advantageous reduction in assembly and maintenance time as well as original fabrication costs. The structure for accomplishing this is shown in FIGS. 3 and 4. A hook-shaped retainer 72 extends around the rigid section and is fastened to adapter bracket 40 (the retainer 72 may also be formed in separate sections bolted to or otherwise secured to the bracket 40). Impact bag 20 has a flap edge portion 76 (or separate portions spaced around the bag) which has a rigid strip 74 secured in the outer end thereof, which stiffened end is inserted in the hook of retainer 72. The hook-shaped retainer 72 and flap 76 extend completely around the outer surface of the impact bag. Thus, the stiffened end of the flap 76 is held tightly in the retainer when the impact bag is inflated, without requiring fasteners such as bolts. The flap 76 may be inserted in the retainer 72 and the latter then bolted onto the bracket 40. Alternatively, the flaps 76 can be secured to the retainers 72 (without removing the latter) in a manner similar to that used in mounting a tire bead over a wheel rim. With the bag deflated, there is sufficient slack to permit connection of the flaps 76 in the retainer 72, which flaps are fully tightened when the bag is inflated. Impact bag 20 is inflated by means of a valve 79 which is mounted on the rigid section (or on the bag itself).

Theory of Operation of the Invention

The bumper system of the invention operates under normal conditions with the same pressure in the flexible impact bag 20 and rigid section 22, since the flexible and rigid sections communicate via the series of ports 52 and valve 50. When the bumper strikes a rigid barrier, the kinetic energy of the vehicle is converted to potential energy by compressing the air in the bag. The kinetic energy is:

$$KE = \tfrac{1}{2} m v^2 \qquad (1)$$

where $m$ is the vehicle mass and $r$ is the velocity. The potential energy is:

$$PE = \int_o^s p A \, ds \qquad (2)$$

where $A$ is the bag area touching the barrier, $p$ is the instantaneous pressure and $s$ is the stroke (i.e. decrease in depth of the bumper). Thus, the bumper characteristics, area, pressure and stroke, needed to afford protection for a vehicle of given mass, can be determined by equating equations 1 and 2; the integration from $o$ to $s$ in equation 2 is employed because both area and pressure vary with the stroke. At the end of the stroke, vehicle velocity $v$ is zero and the bag volume is reduced to a small fraction of the original volume. The air pressure in the bumper is increased because of this volume decrease, and is approximately the same in the bag and in the rigid section, since the associated valve 50 is open for essentially free passage of air. After the impact, the vehicle velocity is zero and all of the absorbed kinetic energy is converted to potential energy in the form of increased air pressure. Since the major portion of the air mass under pressure is pushed from the bag into the rigid section, most of the potential energy is stored therein.

After impact, the interconnecting ports between bag and rigid section are closed by the valve closures 54 when the bag pressure starts to fall. Thus the portion of the potential energy stored in the rigid section cannot return rapidly to the impact bag and therefore cannot contribute to rebound, and the energy remaining in the bag due to less than complete exhaustion will tend to be minor and often negligible. After impact with an obstacle, when the bag is no longer compressed by the obstacle, the volume of the bag increases under its high internal pressure until the pressure inside the bag becomes equal to the ambient pressure. At this point, the bag is limp and the air pressure in the rigid section is higher than the air pressure in the bag, under which condition the valve closures 54 are held closed. Since the valve closures contain small bleeder holes 70, the higher-pressure air in the rigid section bleeds back into the bag and restores the original bag contours and pressure. The bleeder hole size, and thereby the rate of recovery, is designed to avoid harmful contribution to rebound. When the air bleeds back into the bag, the potential energy in the rigid section is reconverted to kinetic energy and the kinetic energy is dissipated in turbulent motion and heat in the bag. The time for this recovery is much greater than the small fraction of a second during which there is danger of rebound, and of the order of a second, so that the system recovers rapidly to be operational for another impact as may occur in multicar collisions.

In normal operation, internal air pressures are applied to the walls of the impact bag and the rigid section, with the effective tensions of the flexible and rigid sections being in opposite directions at the bag-to-rigid section joint. The forces in the bag and rigid section are all in balance with no net force applied to the bracket members 30, 32, 38 and to the vehicle frame members 34, 36. Upon impact, the bag crumples and the pressures in the rigid section, which are no longer balanced by the opposing bag pressures, act on the brackets 30, 32, 38 in a direction to decelerate the vehicle. Effectively, the force generated by the obstacle impact with the vehicle is the impacted area of the bag times the internal air pressure, and this force is transferred by a column of compressed air to the rear wall of the rigid section and thence to the support brackets and vehicle.

The energy that can be absorbed by the bumper system of the invention is directly dependent on the air pressure within the impact bag, the surface area over which the impact is to be absorbed, and the stroke or depth of the bumper. Since, for size and cosmetic reasons, it is desirable to minimize the depth of the bumper, it is especially desirable to maximize the frontal area of the impact bag upon which the impact is to be absorbed. To accomplish this, the impact bag cross-section is made generally rectangular in cross-section with a substantially flat front face 78, as shown in FIG. 3. The flat front face receives the impact pressures over a large contact area than if an impact bag of round cross-section were used. Consequently, larger decelerating forces can be achieved on first contact, and a shorter stroke or bag deflection can absorb the impact energy. Thereby, the bumper can be designed to protrude less from the front and rear ends of the vehicle than if a round-shaped impact face were employed. In addition, the flat face bumper functions with a more nearly uniform load-stroke or deceleration level.

The flat forward or impact surface 78 of the impact bag is maintained by full vertical webs 42 and contour support webs 44. The smaller the spacing J (FIG. 2) between adjacent webs (i.e. the narrower the subcompartment) with respect to bumper height G, the flatter (the larger the radius of curvature of) the front surface of the bumper. A nearly flat surface is achieved when the web spacing is small with respect to (e.g. about 25% or less) the bumper height. However, there are no upper or lower limits of web spacing that may be used. The exterior surface can be made entirely flat (or any other desired ornamental shape) by adding extra non-functional material (e.g. in the depressions at each contour web shown in FIG. 4) to provide the desired surface while maintaining the interior surface in the shape necessary to carry the structure loads.

The total energy that can be dissipated by the bumper is also directly dependent on the number of compartments in impact bag 20 formed by full vertical webs 42. For a given bumper design and level of impact, the greater the number of compartments provided, the greater is the energy that can be dissipated. That is, the energy corresponding to the exhaustion (partial or complete) of one or more compartments is momentarily stored in the rigid section during the prime decelerating stroke (e.g. about 0.1 second on collision of a full size automobile at 5 mph). This energy is essentially not restored during the next comparable time period during which there is danger of rebound, but is slowly returned through orifice 70 over a longer time (e.g. about 1 second). Thus, the energy of exhausted compartments is retained in the rigid section (there is but negligible return of energy to other compartments via their orifices 70) and does not contribute to rebound.

In addition, the division of impact bag 20 into separate compartments prevents catastrophic failure in case one compartment is punctured in an accident. In that event, air is largely prevented from escaping from the rigid section through the punctured compartment via valve 50. The only escape of air would be through the bleeder hole 70 of the valve for the punctured compartment. However, that escape would be negligible during the time of the impact stroke, so that the other compartments would function and be capable of absorbing much of the energy of impact. Moreover, the division of the impact bag into compartments also aids in forming the flat impact face of the bag; the compartments can permit design variations in the impact face (e.g. to be other than flat) so as to accommodate the ornamental requirements of automobiles, and can be used to introduce ornamentation concomitant with meeting safety needs.

Illustrative dimensions and other parameters of the embodiment of the invention of FIGS. 1-4 are shown in Table I, to indicate the relationship of parts described herein and without in any way limiting this invention in its scope. These dimensions and parameters provide a bumper system capable of absorbing sufficient energy (e.g. thousands of foot pounds) to reduce substantially the damage to a 4000 pound vehicle during a 5 mph collision. Other dimensions and parameters can be used to provide different protection.

TABLE I

| Dimension | Size (inches) |
| --- | --- |
| A (length) | 80 |
| B (flat half length) | 10 |
| D (depth of bag) | 2-4 |
| E (center of rigid section to retainer) | 5 |
| F (hole in contour web) | 1½ |
| G (height | 10 |
| H (port diameter) | 1½ |
| I (orifice size) | 0.1 to 0.25 |
| J (web spacing) | 2 |
| Radii of Curvature | |
| K (impact bag face) | 5 (typical) |
| L (end height of bag) | 5 |
| M (end depth of bag) | 5 |
| N (end curve of bumper) | 20 |
| Air pressure | 20 to 40 pounds per square inch |

Basic considerations in the configuration of this pneumatic bumper system are weight and bumper projection in front and back of the automobile, both of which are to be minimized. This configuration tends to minimize weight by providing the rigid section as a load-transmitting member, and a pressurized cylinder is an extremely efficient structural element. By virtue of transmitting loads to the rigid section via the compressed air within the soft bag, and thereby avoiding load concentrations (e.g. sharp points or discontinuities), it is possible to use a minimum gauge sheet metal for the rigid section, thus saving weight. The rigid section is placed directly in front of the car's frame, or it can be combined with the frame; and the forces are transmitted to the vehicle frame or chassis members 34 and 36 through load-spreading or distributing attachments in the form of the yokes 30 and 32, thus introducing no stress concentrations which would prevent thin-gauge construction of the rigid section.

Minimum bumper projection is obtained in two ways. First, the rigid section 22 is located inside the exterior contour at the front and rear of the vehicle; that is, within the front facade or grille, and within the sheet metal trim under the trunk of the conventional automobile. Second, the bag projection may be maintained at about 2 inches for the 5 mph design, by approaching the condition of constant load-stroke performance.

FIGS. 12a and b illustrate the significance of load-stroke curve shape. In all cases, the area under each load-stroke curve is equal to the energy absorbed, e.g. over 3,200 foot pounds for the example assumed.

In FIG. 12a, the five curves have equal stroke and the differences in curve shape are reflected in terms of differences in peak force delivered to the automobile. Curve A is the idealized rectangular load-stroke curve representing the condition of a constant impact force of about 24,000 pounds, corresponding to a uniform deceleration of 6G for a 4,000 pound automobile. An idealized bumper with curve A characteristics has the minimum deflection or stroke of 1⅝ inches. Curve B is the calculated performance of the pneumatic bumper of FIG. 1 with an initial pressure of 30 psi (which corresponds to an initial force of 15,000 pounds) and a final force of 39,000 pounds. Curve C is typical of a spring-supported rigid bumper or other bumper system with a gradual load build-up, and it has a final force of 48,000 pounds. Curve D represents the pneumatic bumper of FIG. 1 modified to show the effects of not utilizing the load-limiting rigid section, but using only the flexible bag volume. In this case the peak force is 67,500 pounds, rather than the 39,000 pounds force of curve B. Curve E is typical of an unpressurized, closed-bag bumper with adiabatic compression of the air to reach a final force of 205,000 pounds. Table II summarizes the peak force results.

TABLE II.

PEAK FORCE FOR EQUAL STROKE AND ENERGY ABSORBED

Figure 1:
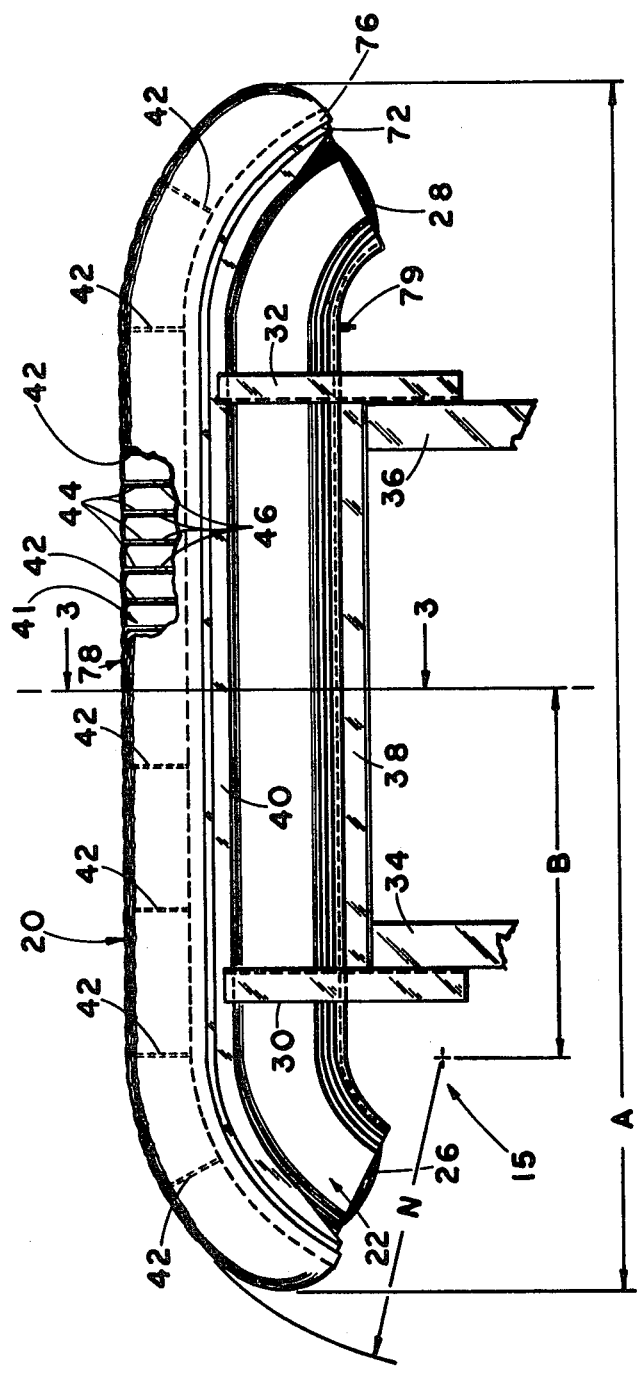
FIG. 1 is a plan view of the bumper system of the invention.

| Curve | Bumper Concept | Peak Force, lbs. |
|---|---|---|
| A | Ideal rectangular load-stroke | 24,000 |
| B | Pneumatic Bumper of FIG. 1 (30 psi) | 39,000 |
| C | Spring Supported Linear Bumper | 48,000 |
| D | 30 psi Bumper, Flexible Bag Only | 67,500 |
| E | 0 psi Bumper, Flexible Bag Only | 205,000 |

Table II illustrates a key significance of load-stroke curve shape, e.g., for equal stroke there may be great differences in peak force and therefore great differences in the requirement for strength of the automobile frame. Stated another way: for a given stroke and automobile frame strenght, it may be necessary to provide an efficient load-stroke curve shape to limit the peak force to a safe value. Note that the peak force of the preferred embodiment of this invention is closest to the ideal minimum of 24,000 pounds.

In FIG. 12b, the five curves have equal peak force and the differences in load-stroke curve shape are reflected in terms of differences in stroke. FIG. 12b is intended to represent the case of an automobile with a specified frame strength (24,000 pounds in this instance) to which may be applied the five bumper concepts, resulting in five different stroke requirements which are the primary concern of the stylists who generally favor the minimum bumper projection for cosmetic appeal. Table III summarizes the stroke results for the 3,200 foot pounds of energy absorbed with a peak force of 24,000 pounds.

TABLE III.

STROKE REQUIREMENTS FOR EQUAL PEAK FORCE AND ENERGY ABSORBED

| Curve | Bumper Concept | Stroke, Inches |
|---|---|---|
| A | Ideal rectangular load stroke | 1.63 |
| B | Pneumatic bumper of FIG. 1 (30 psi) | 2.08 |
| C | Spring supported linear bumper | 3.25 |
| D | 30 psi bumper, flexible bag only | 2.85 |
| E | 0 psi bumper, flexible bag only | 5.47 |

Table III shows that the stroke requirements for the preferred embodiment of this invention (curve B) are closest to the ideal minimum of 1.63 inches, while other bumper concepts may require more than twice the minimum bumper projection.

To summarize the practical significance of providing as nearly a rectangular load-stroke curve shape as possible by virtue of the rigid section of the preferred embodiment:

(1) For a given stroke requirement set by the stylist, the peak force is limited to approach the minimum, thus keeping the force/frame strength ratio to a safe level.

(2) For a given peak force dictated by the frame strength, the stroke is limited to approach the minimum, thus satisfying the cosmetic requirements of the stylist.

The limiting of the peak force and of the stroke is explained by Boyle's Law. The additional volume of the rigid section tends to limit the pressure increase within the bumper upon decrease in volume of the flexible section under impact.

Development of the Preferred Embodiment

To illustrate the major features of the invention and show the differences from prior art, FIGS. 14a - 14e have been prepared giving the evolution from simple pneumatic bumpers of prior art to the full bumper system integrated with the vehicle it protects.

FIG. 14a is typical of prior art pneumatic bumpers wherein a flexible bag is attached to a simple channel which supports the bag but does not contribute to the function of absorbing energy. The bag, being flexible, takes a shape with a large constant radius, as in a cylindrical balloon. This is not efficient from the basis of stroke required, nor is it amenable to shaping for styling or variations which are critical factors in the design of modern automobiles. If the bag is compressed full stroke, back to the support channel, the pressure would become very high and the load on the vehicle would be prohibitive. A load-stroke similar to that in FIG. 12, curve E, would result.

To avoid this excessive load condition, more stroke can be added so that the required amount of energy is absorbed before pressure build-up is too great. This approach is illustrated in FIG. 14b where the bag has more stroke and also has the catenary load path ribs appropriate to a bag without a rear closure (see FIG. 9). The load-stroke for this configuration is illustrated in FIG. 12, curve D. The bag has the shape controlling catenary ribs, and hence can be formed to styling requirements, but the depth (stroke) of the bag is comparatively large and would result in high fabrication costs. The simple channel structure provides support, but again does not contribute to the energy absorption function.

A lower cost solution to obtain the same stroke and performance is shown in FIG. 14c where the bumper has a shallower flexible section and a rigid section resulting in the same volume and load-stroke (curve B of FIG. 12). Since this stroke is adequate for the energy to be absorbed, the remainder of the bumper can be made rigid and also serve as a bumper structure. This provides one of the major features of the invention, the use of the rigid section both to furnish required volume and to act as the bumper structure, leading to a major reduction in weight and cost. The catenary load-path ribs are included to provide control of the bag surface, but the bag is smaller (i.e. shallower) and therefore less expensive to fabricate than that shown in FIG. 14b.

FIG. 14d shows the addition of a rigid wall between the flexible section and the rigid section with a valve to control flow between the two sections. The valve is made large enough to permit substantially unrestricted flow from the bag into the rigid section but closes when flow is reversed, leaving only a small bleed hole to repressurize the bag to initial pressure. This flow control effectively reduces rebound to avoid the harmful effects thereof. The flexible bag is identical with that of FIG. 14c and the load-stroke is also curve B of FIG. 12.

A variation of the preferred embodiment is shown in FIG. 14d wherein several auxiliary features are illustrated. The bumper operation, flexible bag and load-stroke are the same as in FIG. 14d. The rigid section of the bumper may be formed of sufficiently thick steel or aluminum (e.g. of the order of 0.1 inch) so that it can be incorporated with the vehicle frame to act as the end cross member thereof or to reduce the requirements placed on the conventional cross member. This results in further reduction of weight and cost for the vehicle as a whole. A jack fitting for a bumper jack is shown supported by the rigid section of the bumper, and supports are also shown on the rigid section for the grille, fenders or other body parts. These support functions cannot be performed as well, or in some cases cannot be performed at all, by other bumper systems wherein a heavy bumper beam is supported by two or more energy absorbers in a unit package (e.g. hydraulic cylinders), since such bumper beam must move relative to the fenders or other body parts upon impact. The preferred embodiment shown in FIG. 14e is a total functional and structural integration of the bumper system with the vehicle to yield a low cost, efficient design.

Other Embodiments of the Invention

The bumper system of the invention can be readily adapted to a variety of configurations other than the one shown in FIGS. 1–5. For example, the embodiment shown in FIG. 6 has a constant radius of curvature to provide uniform protection over a range of angles of impact with respect to the vehicle center line. FIG. 7 shows the front view of the embodiment of FIG. 6, and FIG. 8 shows a sectional view at section 8—8 of FIG. 6. In this embodiment of the invention, flexible bag 80 and rigid section 82 are shaped to provide a bumper of constant radius of curvature. Dimples 84a through 84e are formed in the walls of rigid section 82 for stiffening. Impact bag 80 comprises a flexible outer casing 86 (e.g. of a tough rubber or plastic coated wire-mesh material) over a plurality of discrete air-tight cylinders 88 (nine cylinders are shown). Use of discrete cylinders to form the separate compartments of the impact bag provides low cost bumper maintenance because one or more cylinders can be replaced without replacing the outer casing or the other cylinders. The outer casing can be secured to the rigid section in the manner described above. Each cylinder 88 is connected to rigid section 82 by a fixed, metering orifice 90 (or with a flapper check valve as described above). The orifice can be formed as a flexible port that fits tightly in a corresponding passage in rigid section 82. Use of a fixed orifice instead of the flapper check valve arrangement of FIG. 3 provides a simpler construction; however, it does not provide as much control of energy transfer and storage as does the check valve.

The bumper of FIGS. 1–4 may also be formed of individual compartments with internal contour webs. Each such compartment can be separately attached to and assembled on the rigid section in the same fashion as the bag 20. Where the radius of curvature varies as in FIG. 1, the individual compartments vary depending on their location along the bumper. With a constant radius of curvature, each compartment is the same except for specially shaped end compartments. An external casing, such as casing 86, may be used if desired.

Figure 9:
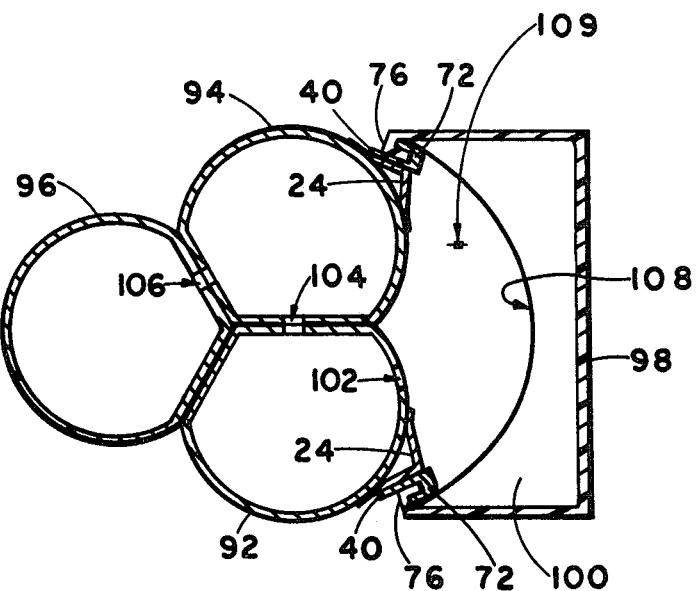
FIG. 9 is an alternative embodiment of the invention using multiple rigid sections or tanks.

FIG. 9 shows a sectional view of another embodiment of the invention which utilizes a plurality of rigid sections 92, 94, 96. Impact bag 98 is similar in structure to the impact bag of the embodiment of FIG. 1, having a rectangular cross-section and comprising a series of compartments similar to compartments 41, which are subdivided into subcompartments by contour control webs 100. Each compartment of the impact bag 98 is connected to section 92 by its orifice 102. Section 92 is connected to adjacent section 94 by orifice 104, and section 94 is connected to section 96 by orifice 106; the diameters of the successive orifices may be made smaller in size. The rigid sections serve as a structural support and back-up for cushion bag 98 and transmit the impact forces to the vehicle frame to which they are connected in a fashion similar to that described above. In this embodiment, air is forced out of bag 98 during impact, into section 92, and then sequentially into sections 94 and 96. The flow of air is restricted by orifices 102, 104 and 106, and a substantial part of the energy is dissipated. In the embodiment of FIG. 9, the orifices have diameters of approximately one-half inch. Although three sections are shown in FIG. 9, a greater number may be cascaded. The capability to dissipate energy increases with the number and volume of rigid sections, but the bumper system also becomes more complex.

The rigid sections and orifices for this case are sized so that a maximum of energy is dissipated (minimum rebound). This is done by determining the orifice size which results in a mode of operation where minimum energy is recovered for a given impact energy, bumper design, velocity, rigid section size, and number of sections. The number of rigid sections may be varied independently to arrive at an optimum solution for the specific requirements attendant to that application. Rigid section sizes may be varied between the designs and within a specific design, or may be kept constant and equal for convenience. A simple rigid section size for any particular multi-section design is that of each section having the same volume as the impact bag. See NASA Technical Note, NASA TN D-9710, Langley Research Center, August, 1968.

A variation of the contour support webs is shown in FIG. 9. Instead of the holes in the webs, an inner opening 108 in the web is formed in a catenary shape (or a shape such that the webs have a catenary load path therein, as explained more fully hereinafter), so that the webs 100 carry pressure loads from the front face to the attachments at the rigid section and balance the loads between the top and bottom surfaces. This configuration has obvious advantages in reduced fabrication complexity but causes greater loads to be introduced into the support structure. Each of these webs 100 (in a fashion similar to the webs 44) yields individually so that each sub-compartment yields to the shape of the obstacle.

Other supports or bulkheads may be used to support the outer "skin" of the cushion and to take up its tension to form desired contours. For example, vertically extending tubular struts may be inserted into the cushion skin along the front (vertically extending) impact face 78 of the bag, inside or out of the pressure cavity of the bag. In this variation, the forward face of the cushion is formed with pockets (e.g. internally accessible) into which are inserted rigid struts of metal or plastic. The struts are made strong enough to carry the internal air pressure load over the span from the top surface to the bottom surface of the cushion. During impact, they carry a similar air pressure load and can be impacted at any point along their length by the obstacle without exceeding their capability. The struts may be molded into place during construction of the cushion, or designed to be inserted afterward and to be replaceable in case of damage in an accident that exceeds design criteria. Since the struts are preferably within the skin material, a hard rigid surface is not exposed to impact pedestrians. The struts and local cushion can yield inwardly individually so that the cushion conforms to the shape of the obstacle and excessive pressures are not generated.

FIG. 9 also illustrates another form of the invention in that the cushion bag 98 is not formed as a complete tubular enclosure, but instead the back wall section is omitted. The front wall sections of rigid sections 92 and 94 serve as the back wall for the bag, and air sealing is achieved at the tight flap and retainer connections 76 and 72. Sealing between compartments of the bag is by means of full sized webs 109 similar to webs 46 described above except that special provision is made for connection of the back edge of each such web 109 to the front wall of the sections 92 and 94. The connections may be a series of spaced U-channels on the wall of the rigid sections into which slide, respectively, beaded edges of the compartment webs 109. Such an arrangement would afford an adequate air seal between compartments.

In the embodiments of the invention shown in FIGS. 1, 6 and 9, the rigid section is constructed of a thin gauge metal. This provides advantages in bumper weight and cost because the rigid section serves both as an additional volume for bumper functions and as a support structure for attaching the impact bag to the vehicle frame. The rigid section, since it does not undergo major deflections during normal bumper operation, is solidly attached to vehicle structure, or, to save cost and weight, the rigid section is combined with structural elements such as the front frame cross member. The rigid section can provide support for other vehicle components such as fenders, grille and radiators, or it can have ample structural strength for trailer towing and attachment of a bumper jack. This combining of functions in the rigid section helps in achieving a light weight vehicle and reduced cost just as combining of functions within the bumper leads to a light weight, low cost bumper.

The rigid section also limits the peak impact pressures, minimizes rebound, and restores pressure to the cushion. However, if required to satisfy specific conditions, a bag or tank constructed of a flexible material such as that used for the impact bag may also be used. The application for a flexible tank may be caused by installations where adequate space for an efficient volume is not available directly behind the bumper location, or where the configuration is such that it is desirable to collapse (deflate) the tank for storage or other special functions of the vehicle. In this case, a flexible tank can provide design solutions not available if a rigid section directly behind the bumper must be used.

The rigid section size is designed primarily by proportion to the volume of the bag, so that the combined volume is such that the pressure rise during a maximum stroke impact does not exceed the overall peak design pressure for which the system is designed. The pressure rise is inversely dependent on the volume of the rigid section which must contain all of the air forced out of the bag as well as the air originally in the rigid section. Hence, a larger rigid section means a lower pressure rise, a more nearly uniform deceleration level (force), a shorter stroke, and less protrusion of the bumper from the vehicle.

If not enough space is available for a rigid section of the desired size, an alternative approach is to provide a bumper with a reduced volume rigid section on both the front and the rear of a vehicle (or to reduce one and not the other) and to interconnect the two rigid sections with a pipe of sufficient size to prevent pressure drop at the expected flow rates. The interconnected rigid sections act as a unit for each bumper in preventing large pressure rises during the maximum stroking of the bumper within the design impact velocity range of the bumper. In a simple case, each rigid section could be only half of the volume otherwise required. Similarly, a tank or other container could be located anywhere in or connected to the interconnect line to make up the required volume. The interconnect pipe may provide a substantial portion of the required volume. In this arrangement, both the rigid sections of the bumpers and the interconnecting pipe can be combined with structural elements such as the vehicle frame or used to support other vehicle components. The apparatus is designed to function properly up to a given velocity of impact which is herein called the design impact velocity range of the bumper.

If a rigid section of the desired volume cannot be adequately stowed within allowable space, an alternative version of the bumper may be used which is especially suitable for use on buses, delivery trucks, and other compact vehicles. The rigid section is reduced in size to be essentially a manifold 200 (FIG. 9A) with connections via check valves 50 to each bag compartment 41. The flexible bag 98 is supported primarily by other structures, as, for instance, bumpers 202 of the type now in use on buses and trucks, and the manifold 200 may be placed above the cushion 98 or in any nearby available location. The manifold 200, or each bag compartment 41, is equipped with a relief valve 204 which allows excess pressure to be vented to the atmosphere as air is forced into the manifold 200 from the bag during impact. After impact, the relief valve 204 closes and reseals itself when pressure approaches initial inflation pressure. The manifold 200 also serves as the single refilling point for all the bag compartments 41. The volume of air required to restore the bag volume to the desired initial pressure may be supplied by an onboard source such as a compressor 206 or high pressure storage tank which can be operated automatically, or it may be supplied from the nearest service station.

Although the gas used in the preferred embodiments of the invention is air, other compressible gases may be used. Air is especially desirable where the cushion bag is vented directly to the ambient on impact; in this case the air supply service available at a service station or carried in the vehicle (e.g. trucks and buses) can be used to restore the bag after impact.

Advantages of the air cushion bumper with respect to pedestrian safety are due to the low pressure that it will impose on impacting the pedestrian, such as in the legs, as compared with the stresses that would result from impact by a metal bumper or a metal bumper having a thin pad of resilient material. The stress imposed by the air cushion is limited to the inflation pressure, about 30 psi, which can be withstood by the body, while a steel bumper has an allowable bearing stress in the order of 50,000 psi, which would crush bone.

Additional safety advantages of the air cushion bumper can be realized from the use of characteristics inherent to the system. The increase in air pressure in the bumper due to impact can be used to implement the operation of other safety systems for passenger and vehicle safety. Safety devices such as internal bags for positioning passengers can be inflated by a control device (not shown) actuated by an electrical signal from a sensor (e.g., a strain gauge) 108 (FIG. 3) in the rigid section 22 in response to the air pressure increase in the bumper. An automatic application of the vehicle brakes can also be implemented by a signal from such an air pressure sensor or from a diaphragmactuated element in which the diaphragm is connected via a tube 110 to be responsive to the pressure in rigid section 22. Locking the brakes can be important if the vehicle driver is momentarily incapacitated in cases where a vehicle is struck from the rear and may roll forward to strike another vehicle. The locked brakes will also prevent much travel from residual rebound, or if a vehicle is on a grade sufficient to roll freely. This versatility in coordination with other safety systems is important in the bumper system which, by definition, is the first point of contact in case of a crash.

Several theoretical approaches may be adopted for purposes of triggering the safety devices within the passenger compartment of the vehicle, with the basic requirement that velocity of impact must exceed 15–30 mph before actuation may be permitted. In this application, the requirement of sensing impact velocity may be fulfilled by making use of the rate-of-change of bumper pressure, which is proportional to impact velocity. In one arrangement, the rate of flow of gas from bag to rigid section may be used, since it is proportional to impact velocity and proportional to the pressure difference across the orifice between bag and rigid section. This pressure difference may be sensed by a differential pressure gauge having its two input ports respectively connected to the bag and rigid section and used directly for activation purposes when the sensed pressure difference is at the required level. Another arrangement of an impact velocity sensor 112 is shown in FIG. 13, in which air pressure from the bag or rigid section 22 via tube 110 of sufficiently large diameter is delivered into a casing 113 to one side of a movable piston 114 which contains an orifice 116 and which is mounted on slack diaphragm 118 for movement in a closed chamber 120 on the other side of the piston. Connected to the latter is an actuating rod 122 which moves through a casing wall 123 which is sealed by a diaphragm 124 around the rod 122 and wall opening. A spring 126 balances the piston in a normal intermediate position and balances the air pressure on sealing diaphragm 124. The orifice size and the chamber volumes on opposite sides of the piston are selected so that impacts above a certain velocity (e.g. 15–30 mph) produce a pressure rise fast enough to cause motion of the piston 114 into chamber 120. Slower pressure rises do not cause piston motion because air flows through the orifice too quickly to permit enough pressure difference to develop across the piston. For example, a 30 mph impact on the illustrative example of the FIG. 1 bumper, having a bag of about 2 inches deep, results in a pressure rise from about 30 psi to 38 psi in several milliseconds. Under these conditions, the piston 114 is moved by the pressure developed across the orifice 116 and the concomitant rod movement can be effective for actuating a safety or control device as noted above. For example, the actuating rod 122 of the impact velocity sensor 112 can operate a valve 128 (FIG. 3) between a large diameter output port 130 of the rigid section 22 and a conduit 132 to a safety device. At the critical impact velocity, the valve 128 is opened to pass the compressed air from the rigid section 22 to a safety device such as an air bag to inflate it or otherwise operate it. Collisions of such velocity are likely to be so damaging that safety calls for use of the compressed air of the bumper system directly for protection of passengers where possible.

The air cushion bumper can be designed to withstand a 10 mph impact rather than a 5 mph by increasing the cushion depth (stroke) to accommodate 10 mph (e.g. a stroke of about 10 inches vs. 4 inches) at the acceptable deceleration level for the vehicle and occupants. The rigid section volume and air pressure can then be defined to achieve a balanced design. Impact surface area of the cushion as well as inflation pressure may also be increased for increasing the capability of the system. Similar changes can accommodate higher speeds, and if the vehicle is strengthened sufficiently to take higher deceleration loads, crashes at speeds of 20 to 30 mph can be tolerated with no damage to the vehicle. Systems of this nature must be coupled with internal restraints to the occupants to avoid serious injury under the high sustained deceleration. Still higher velocities, to 60 mph at least, can be accommodated if the bumper is increased in height, stroke and inflation pressure leading to more energy-absorption capability.

Figure 10A:
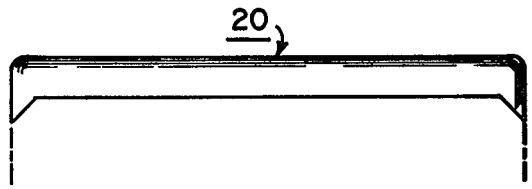
FIGS. 10a and b are plan-view sketches of ornamental designs of bumper shapes employing this invention.
Figure 10B:
Figure 11A:
FIGS. 11a and b are elevation-view sketches of ornamental designs of bumper shapes.
Figure 11B:
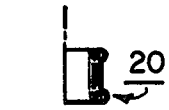

FIGS. 10a and 10b illustrate plan views and FIGS. 11a and 11b illustrate elevation views or profiles of various ornamental designs and configurations (composed of rounded and angulated shapes) that can be fabricated with the impact cushion 20 of this invention employing the compartment and contour web structures for the various embodiments described above and below. The rigid section can be readily fabricated to provide a shape along its length corresponding generally to that of the bag and shaping the bracket 24 to accommodate unusually shaped areas. The compartments of the bag can be designed consistent with the overall impact requirements, and the compartment webs can be located at regions of discontinuity in cushion shape. The contour webs (or other bulkhead structures) can be used to define the profile shape of the functional portion of the cushion, and additional non-functional shapes can be added by filler material at modest cost as may be desired. In FIGS. 11a and b the protrusions can be achieved by appropriately shaping the contour webs or by filler material. Though various ornamental shapes can be achieved, the bumper impact surface is essentially planar since the protrusions in profile are negligible and various angulated sectional arrangements can be formed which are substantially planar.

Since the contour webs 100 (FIG. 9) provide the catenary load path to maintain a substantially planar front surface, they can also serve to maintain a front surface made up of a series of planes in plan view as shown in FIG. 10b or a series of planes in elevation view as shown in FIG. 11a. A flexible bag with internal air pressure will take a full rounded cross section if no internal or external restraints are provided. Having provided the ribs or other catenary type load paths to develop and maintain a substantially flat front face, the same load paths can be used to maintain other surface contours. Similarly, since a curved line is made up of an infinite number of straight lines, the catenary type load path will maintain curved contours constructed on the front surface (FIG. 11b) in both plan and elevation views. The top and bottom surfaces are special cases of shapes analogous to the front surface. Hence, they can also be maintained in a shape which is substantially planar, a series of planes or curves, or any combination thereof, by proper location and design of the catenary load path contour ribs.

The load path resisting internal pressures between ribs is also a catenary type using the flexible front surface (and top and bottom surfaces) as the catenary. This is illustrated in FIG. 4 where the impact face 78 is shown curved in a catenary type shape to carry air pressure from one vertical rib to the next rib. This curvature or radius of impact face 78 is carried into the end section of bag 20 to form the end radius of the bumper. By adjustment of the end radius to which the bag is fabricated, the desired amount of tension can be induced in the impact face 78 and will carry over into the catenaries between succeeding ribs to maintain the substantially flat face shown. The air pressure load carried from the impact surface into the ribs 100 and 109 (see FIG. 9) is carried by the catenary type load path in the ribs back to the bag attachments 76 at the rigid section.

The preferred embodiment shows the flexible section of the bumper separated from the rigid section by a rigid wall with flapper valves to control flow therebetween. However, where low cost is essential and rebound limitation is unimportant, the flexible and rigid sections can be constructed as essentially a single cavity (see FIG. 14c), with the volume based on expected bag stroke and limitation of the pressure rise to a pressure acceptable to the vehicle the bumper serves to protect.

The forward, top and bottom surfaces and the internal construction of the flexible section can be designed to meet specific requirements imposed on a given bumper. Such requirements include withstanding concentrated loads at particular locations on the bumper, as well as preventing relative vertical motion between impacting bumpers of other vehicles, commonly called override or underride. For example, if a bumper must withstand a concentrated force at a certain location, thicker webs can be located at that area to absorb more energy in buckling as well as to distribute the loads over a greater area. Other examples of meeting specific requirements are to provide controlled deformation at the flexible section during impact in order to maintain continued protection of the vehicle despite any tendency toward underride or override, or to provide means for high surface friction to prevent underride or override.

FIG. 15 illustrates several means of tailoring the geometry and internal shaping means of the flexible sections 20''' (parts similar to those described above are referenced by similar numerals with the addition of primes '''). The forward impact surface 78''' is molded with ridges and depressions 130 of various shapes similar to the tread of an automobile tire in order to aid in preventing a matching bumper on another vehicle from slipping under or over the bumper shown, which would lead to serious damage. The lower external surface 133 is molded with a slope corresponding to the approach (or departure) angle of the vehicle. The approach angle is measured between the road surface and a line from the most forward part of the lower edge of the vehicle (the bumper) to a tangent with the front tire. The approach angle is important in relation to ramps; the approach angle exceeds the angle of the ramp to properly clear the ramp.

By appropriately sloping the lower internal surface 134 of the flexible section to utilize the space outside the approach angle envelope (e.g. the lower rear corner), a maximum volume of air to be compressed is provided, but the approach angle is not violated. The lower wall is also molded to be thicker to have a greater energy absorbing capability, especially where cosmetic or other considerations dictate a shorter stroke. The top wall 135 is shown with an offset or step 136 which serves as a controlled hinge that causes buckling at that point to better define and control the movement of the material of the flexible section under impact. The lower front surface, just above the lower edge, has a concave contour 138 specifically designed to accept and retain a bumper bar on another vehicle so that the tendency to "override" the other bumper is minimized (i.e. vertical slippage between bumpers is reduced).

Within the flexible section, flexible diagonal ribs or truss members 140 are provided to transfer part of the load from the lower edge 134 of the bumper to the upper wall 135 and structural attachment 142. The vertical load bearing webs 100''' with a catenary shaped load path 108''' may be used to provide contour control, and may also be increased in thickness, or in number, or have a changed contour in the key area where a concentrated impact is anticipated. The diagonal ribs 140 may be formed as thicker reinforced sections of the webs 100'''. The stroke and the height of the flexible section 20''' may also be increased locally where a specific requirement exists to tolerate the impact of a concentrated force. The webs 100''' and ribs 140 are load bearing and cause the bag to assume and retain the shape established when molded. The flexible section 20''' is an openback bag such as that of FIG. 9; the flapper valves 50''' are formed in the interface 148 of the rigid section. In addition to these bag shaping features, ornamental shaping (such as that of FIG. 10 and of FIG. 11) may be molded in or otherwise provided. However, the cross-sectional aspect of the bag tends to be generally a rectangular shape. The rectangular shape and a flat impact face are desirable to limit the depth of the stroke upon impact. However, variations in flatness and rectangularity are provided for styling and for other special requirements, such as for preventing override and underride. It is generally desirable to keep the deviations from the vertical planar impact surface as small as possible to limit the stroke.

The flexible section 20''' may be attached to the rigid section 22''' in the manner shown in FIG. 15, that is, by means of a bead 144 on the open edges of the flexible section 20''' horizontally around the entire periphery. The bead 144 is molded on the outward sides of the lower and upper walls 134 and 135 of the flexible section for greatest ease of molding and removing from the mold. However, when locked in position, the bead is bent to assume an inward location as shown in the drawing. The bead 144 is inserted in the opening 146 in the structural edge member 142 running horizontally continuously around the rigid section at the interface 148, and oriented to receive the horizontally located bead 144. After insertion of the bead 144, the retainer 150, formed of a lightweight metal such as aluminum or of a rigid plastic, is inserted into the structural edge member 142 of the rigid section; the retainer 150 is elongated stripping that extends around the entire periphery. The insertion of the retainer (with the assistance of suitable tools) forces the walls and bead 144 of the flexible section inwardly until the retainer 150 latches over the hook 152 on the edge member 142. The resilience of the walls of the flexible section aids in holding the retainer hooked on the edge member. Upon the introduction of air pressure into the flexible section, the walls force the retainer 150 to lock securely over the hook 152 and to be held by a force proportional to the air pressure. The bead 144 is thereby retained in its distorted condition within a cavity formed by the retainer 150 and the edge member 142, and the cavity opening approximates the thickness of the walls of the flexible section. By designing the cavity opening to be slightly smaller than the wall thickness, a wall compression can be built in, assuring leak-tightness in the seal before air pressurizing, which seal is improved with the pressurizing. In any case, introduction of air pressure into the flexible section causes the bead to be pulled against the retainer, locking the retainer more tightly on the hook of the edge member. The same tension causes a wedging action forcing the bead tightly against the edge member, effecting a tight seal. During impact of an object on the flexible section, the top and bottom walls will buckle and bulge outwardly due to increased internal pressure. This bulging of the walls and increased pressure will pull outwardly on the retainer, locking it even more securely in place. This construction also serves to permit relatively convenient assembly for mass production and maintenance operations.

The attachment shown in FIG. 15 uses a wedge shaped bead 144 on the flexible section wall (other shapes may also be used) either molded in that shape or forced into it by insertion of the retainer. The retainer is shaped with a ramp 154 which forces the bead of the flexible section into position in the edge member. In the installed position, it locks under the hook 152 on the outward leg of the edge member and is retained by precompression (resilience) in the wall of the flexible section. The thickness of the bead in general is from 1½ to 3 times the thickness of the walls of the flexible section at the minimum opening of jaws 146 of the edge member 142, although no limitations exist for most materials.

The joint of the flexible section to the edge member as shown in FIG. 15 is an efficient means of attachment where the joint is straight as near the center of the bumper. However, if square or sharply angular corners are used at the bumper ends or elsewhere, the bead on the flexible section and the channeled edge member may not match perfectly, leading to a possibility of leakage. Therefore, it is important to provide that any corners in the joint have a large radius of curvature compared to the spacing between the jaws of the edge member in the vertical plane (i.e. as installed on an automobile, such as shown in FIGS. 1 and 2). This large radius will permit the edge member to be formed in a smooth continuous curve to match a like construction of the bead on the flexible section. The retainer stripping may be formed in a similar matching curve or may be fabricated in a straight section and formed during installation, since it may have a low stiffness in the vertical plane.

The rigid channel and flexible bead attachment of FIG. 15 may be used for various other forms of pneumatic bumpers including those described above with reference to FIGS. 1 and 9. Moreover, the surface features of the flexible bag to prevent override and underride of bumpers upon collision and the shaping of the bumper to be generally rectangular in cross-section for optimum volume and stroke limitation may be used in the other forms of this invention described above.

In other respects the bag structure is constructed in a manner similar to the embodiments described above. The flexible section is open-backed as in the FIG. 9 embodiment and is preferably formed in closed compartments as in the FIGS. 1 and 6 embodiments, with separate flapper valves for each compartment. In addition, longitudinally inextensible materials are used, and the flexible section is secured to the rigid section around its entire periphery.

The material selected for the flexible section of the bumper is important for proper performance during the impact stroking. The material must be stiff enough (i.e. have a large enough Young's modulus or flexural modulus) to maintain the intended shape under the design air pressure; yet it must be flexible enough (have a small enough flexural modulus) so that it will crumple and be deflected under the design impact load (which is the most severe load for which the bumper is designed). Preferably, the flexible material should provide less than 30% of the force (or pressure) required to oppose the impact force which tends to deflect the flexible section through its planned stroke. This permits the majority of the load to be carried by the internal air pressure as intended by the features of this invention. This primacy of the air pressure in load bearing is important since most plastics and other materials having the proper stiffness exhibit a characteristic increase in stiffness with low temperatures and a decrease in stiffness with high temperatures, both of which might result in improper performance under impact. Analysis has shown that materials having a flexural modulus of 3,000 to 50,000 psi are most suitable for bumpers to be used for current over-the-road vehicles having weights of 2,000 to 50,000 pounds. Materials having a flexural modulus as low as 500 psi or as high as 300,000 psi may be satisfactory for special cases of velocities and vehicle sizes. Available materials having a flexural modulus in these ranges inlude polyurethanes, urethanes, rubbers such as thermoplastic rubbers, polyolefins, and polybutylenes. Known homogeneous materials having a flexural modulus in the above range at 70° F. are DuPont's Hytrel-5525 (30,000 psi), Hytrel-4055 (7,000 psi), Hytrel-6355 (50,000 psi); Adiprene L-213 (15,000 psi); B. F. Goodrich's Estane 58109 polyurethane (900 psi) and Estane 58111 polyurethane (4,000 psi); Uniroyal Chemical's Roylar E9 (4,000 psi) and TPR 1910 (12,000 psi); Witco Chemical's PB-131 polybutylene (30,000 psi). Most of these materials are affected by temperature changes so that the material must be selected by consideration of the flexural modulus at all of the required temperatures. The tensile modulus and compressive modulus of elasticity are closely related to the flexural modulus in most materials, so that these properties may also be used as indicators of a material's suitability. In addition to such homogeneous materials, stratified materials formed of layers of different materials with different flexural moduli may also be used to provide a composed material having an effective modulus in the desired range.

As described above and in the technical paper by Jack E. Gleck, David A. Weitzenhof and Ernest J. Merz entitled "A High Energy Level Pneumatic Energy Absorbing Bumper," Society of Automotive Engineers No. 730029, 1973 (which paper is here incorporated by reference), this invention may be used in a form in which the pneumatic section exhausts directly to the atmosphere during collision. That is, relief valves are provided for each compartment (e.g. at each of the ports 50 of FIG. 1) which open when deformation of the flexible elastomeric section 20 has compressed the air to a predetermined blow-off pressure. The relief valves may be located in the flexible or rigid section and may be used with single volume bumpers of the form shown in FIGS. 14b and 14c. Each of the compartments may be connected to an air supply manifold for reinflating the system after the collision when the relief valve closes. Such an arrangement is especially suitable for vehicles such as trucks and buses, which already have the capability of generating their own compressed air for brakes and air suspension. This air supply is fed to the manifold through a pressure regulator which maintains the compartments at the predetermined pressure. In the absence of an air compressor on the vehicle, a high pressure tank may be conveniently located on the vehicle and used as a source of compressed air supply for reinflating the flexible section.

The front surface of the bumper normally is formed with a substantial radius at each end (as viewed from the top, e.g. as in FIG. 1). This radius, and the air pressure acting thereon, causes a lateral tension, proportional to radius and pressure, to be built up within the material of the front surface. If the material has a high tension strength along its length so as to be essentially resistant to stretching (longitudinally inextensible), the tension is transmitted throughout the length of the front surface. Upon impact with a locally concentrated obstacle, the tension will tend to keep the flexible section stretched flat and thereby will spread the load over a wider area of the bumper. That is, an impact at one compartment is distributed over several adjacent compartments, which leads to more capability of resisting a localized load. The tension in the front surface resists the localized load the way a clothesline supports an article hung at its center. The volume of displaced gas may be much greater (e.g. twice as great) than the volume of the impacting object, due to the formation of compartments and the longitudinally inextensible impact surface. The compartment construction and individual relief valves also ensure that the gas compressed by impact is exhausted (e.g. into the rigid section) rather than being captured and compressed in the flexible bag. The aforementioned homogeneous elastomeric materials and the fiber 208 reinforced materials (both fabric and wire-mesh) have the desired property of being effectively longitudinally inextensible when the flexible section is constructed and mounted in accordance with this invention.

The contour control webs 100 and 100''' for the open-back flexible section (see FIG. 9 or FIG. 15) are designed to control the contour of the flexible section by providing a tension load path to resist the air pressure which tends to deform the flexible section from the desired rectangular cross-section into a circular segment as seen in cross-section (see FIG. 14a). The contour control webs 44 for the closed-back flexible section 20 (see FIG. 1) are attached substantially around the internal surface of the flexible section and therefore restrain the shape of the pressurized bag by simple tension load paths. However, the tension load paths for the open-back type are more complex.

FIG. 16 is a schematic diagram in a vertical cross-sectional view similar to and representative of the bumper apparatus of FIG. 15, in which parts corresponding to those described with respect to FIG. 15 (although represented schematically) are referenced by the same numerals. The flexible section 20''' is illustrated as a broken series of small rectangles 160, each of which represents an element of the elastomeric wall of section 20'''. The flexible section 20''' is attached to the fixed channel attachments 142' of the rigid section 22'''. Each flexible web 100''' provides material that serves as a tension load path from each element 160 of the exterior walls (top, impact and bottom) of the flexible section to the attachments 142' in the rigid section 22'''. The tension load paths 161 and 162, illustrated in FIG. 16, are in a direct line from the wall element 160 to the attachments 142' through the material of the web 100'''. This web material, which serves as the tension support for one wall element 160, can be considered as equivalent to strings that are strong in tension but buckle and fold aside when a compression load is applied as under impact.

In a similar fashion, the air pressure loads on elements 163 and 164 in the top and bottom walls, respectively, are tied together by strings in a direct line between those elements through the web material. However, due to the curved back edge 108''' which prevents direct load paths through the web, some of the wall elements 160 are maintained in tension by way of paths which include, in addition to the web material, the exterior wall adjacent to the attachments 142'.

When the strings for all of the elements on the surfaces are added (or integrated) together, they form a web of varying thickness (which varies with the number of strings which, in turn, varies with the load distribution) and having a curved edge toward the open back of the flexible section plus an internal load path 166 which is similar to a catenary. All of the loads due to gas pressure are tension loads opposing the gas pressure, which tension can be carried by a web material that must be flexible enough to buckle under impact.

A catenary-type load path is derived from the "tension only" loading on the webs. (A catenary is the shape taken by a loose chain hanging freely between two points, which chain is strong in tension but has no strength in bending or compression; a suspension bridge, the common example of a catenary, uses heavy cables hung between two towers to suspend a roadway by closely spaced smaller cables attached to the main catenary cables, all of which cables are in tension only.) Similar to a catenary, the material in the contour webs is stressed in tension only, in all directions in the plane of the web.

It has been suggested in the prior art of pneumatic bumpers that a web having a straight free edge and a stiffened wire along that edge may be used; see, for example, the patent to Claveau, U.S. Pat. No. 2,828,915. The rib material along such a straight vertical edge would be unstressed (or, if sufficiently stiff, under compression), which would result in its buckling under normal inflation pressures. Whatever aid a wire for stiffening such a straight free edge may provide in resisting air pressure loads on the flexible walls, it would be subject to bending loads on such a wire, which by its nature is normally poor in resisting bending. A stiffening wire would also be subject to damage during impact and might otherwise puncture the walls of the pneumatic body and lead to stress concentrations, wear points, and potential failures.

A preferred way to provide flexible means of contour control with efficient use of material is by the webs of this invention, which preferably have a curved edge and an internal catenary type load path, which path is the locus of the centroids of the loaded web area. The material in these webs is located by analysis and molded or otherwise fabricated in the proper areas to maintain the contour of the flexible section against any level of internal air pressure using tension strength alone. A complex analysis is required to obtain a precise optimum material distribution (for equal stress in all elements throughout the web), but a close approximation can be obtained by simple graphic analysis. The shape of the actual load path 166 in the web 100''' of the flexible section 20''' is preferably an approximate radius tangent to the top and bottom flexible walls at the joints 142' to the rigid section. The curve of the free edge 108''' may be designed, after locating the load path 166, so that path 166 is the locus of centroids.

The contour control webs 100''' are specifically designed to make optimum use of the material (i.e. without waste) by providing a carefully engineered tension load path and eliminating unnecessary material along the free edge 108''' opposite the impact surface. Additionally, the opening thus provided between the free edge and the rigid section is important for the free passage of gas between compartments.

The selection of a closed bumper system using a large volume rigid section (large with respect to the volume of the flexible section) or a refillable bumper system using an external pressure source to refill and relief valves to exhaust to the atmosphere is dependent on several factors including space available for the rigid section, the availability of a compressed air source on the vehicle, and cost comparisons of the two approaches. For the closed bumper system, the larger the volume of rigid section, the greater the benefits of load and stroke limiting. By choosing the volume of rigid section to be generally the same as the volume of the flexible section, most of the benefits of such limiting are gained without the adverse effects and cost of additional weight and size. If other constraints limit the rigid section volume to the order of 25% or less of the flexible section volume, it may be more desirable to use a refillable system with relief valves to limit pressure rise. The value of 25% is not a lower limit for a closed bumper system, nor an upper limit for a refillable system (no limit exists in either case), but is the area where consideration might be given to both approaches.

The various features of this invention that are not specifically limited to a closed bumper system may be used in various forms of refillable systems. For example, the advantages of this invention described above with respect to force and stroke limiting apply generally as well as refillable pneumatic bumper embodying this invention which exhausts to the atmosphere and is thereafter refilled with compressed air. Thus the force and stroke limiting advantages indicated by curves B in FIGS. 12a and b also apply to the refillable system and may be increased by proper large sizes of relief valves. In both systems, the internal surfaces of the impact and other walls are shaped to maintain a generally longitudinal tension in those exterior walls between the flexible webs. As a consequence, the external surfaces of those exterior walls are maintained in a certain desired wall shape. This wall shape can be considerably varied to meet ornamental preferences, but consistent with ornamental compromise the shape of the wall surfaces can nevertheless approach the planar surfaces which tend to produce the optimum limitation of force and stroke.

A salient feature of this invention is the shaping of the flexible section of the bumper to attain a generally rectangular cross-section in opposition to the gas pressure. This rectangular cross-section tends to achieve an optimum bag volume for a particular ornamental design, and thereby serves to limit the stroke of the impact wall. Since the ornamental design of vehicles (e.g. passenger cars) customarily strongly influences the functional design and sometimes overrides it, it is difficult to define the exact shape of the flexible bag. However, by means of this invention, though substantial departure from the rectangular cross-section may result for ornamental or for functional reasons, the resulting cross-section can still be in large measure rectangular (as may be seen in FIG. 15) so that the bag volume is optimized and thereby advantages in limitation of force and stroke are achieved.

Other modifications of the invention will be apparent from the above description. For example, in certain special applications it may be desirable to have a flat metal face in front of the flexible section. One form of this arrangement would be to locate the rigid section in front of the pneumatic section so that the impact is applied to the rigid section.

THEORETICAL ANALYSIS OF IDEALIZED PNEUMATIC BUMPERS

In order to obtain estimates of pneumatic bumper performance, the practical bumper system is idealized to permit theoretical analysis as follows:

(1) The bumper area, A, being loaded externally is a constant value at any deflection, x, from zero to the maximum stroke, $X_1$, which is always less than the full bag-plus-rigid section depth $S_o$.

(2) The bag material offers some resistance to motion, negligible compared to the resisting force of the air. Air resistance provided by the bag's internal air pressure $P_x$ is as follows:

$$F_x = A(P_x - P_a) \qquad \text{Eq. (1)}$$

where $P_a$ is the atmospheric pressure outside the bag. Internal pressure $P_x$ varies from the initial pressure, $P_o$, to the maximum pressure, $P_1$, at the end of the stroke.

(3) Air is compressed adiabatically inside the bag according to the following formula:

$$P_x/P_o = (S_o/S_o - X)^{1.38} \qquad \text{Eq. (2)}$$

(4) Energy absorbed by the bumper is as follows:

$$E = \int_0^x F_x dx \qquad \text{Eq. (3)}$$

To calculate the peak force $F_1$ at the end of the stroke, Eq. (1) and Eq. (2) are combined as follows:

$$F_1/AP_a = \frac{P_o}{P_a} (S_o/S_o - X_1)^{1.38} - 1 \qquad \text{Eq. (4)}$$

In order to claculate the energy absorbed at the end of the stroke, Eq. (1) and Eq. (2) are substituted into Eq. (3) as follows:

$$E_1 = A \int_0^{X_1} P_o(S_o/S_o - x)^{1.38} - AP_a X_1 \qquad \text{Eq. (5)}$$

Integrating Eq. (5):

$$\frac{E_1}{AP_a X_1} = \frac{1}{0.38} \left(\frac{P_o}{P_a}\right)\left(\frac{S_o}{X_1}\right)[(S_o/S_o - X_1)^{.38} - 1] - 1 \qquad \text{Eq. (6)}$$

To calculate the examples represented by FIG. 12a the following constants were used:

$A = 500$ square inches
$P_a = 14.7$ pounds per square inch
$X_1 = 1.625$ inches
$E_1 = 3,250$ foot-pounds With these constants, the parameter $E_1/AP_a X_1$ is equal to 3.26.

Using Eq. (6) and $P_o/P_a = 1, 2, 3$ one can calculate the corresponding force values at the same $X_1/S_o$ values:

| $P_o/P_a$ | 1 | 2 | 3 |
|---|---|---|---|
| $X_1/S_o$ where $E_1/AP_a X_1 = 3.26$ | .907 | .683 | .425 |

-continued

| $P_o/P_a$ | 1 | 2 | 3 |
|---|---|---|---|
| $F_1/AP_aX_1=3.26$ | 28 | 9.2 | 5.3 |
| $F_1$, pounds | 205,000 | 67,500 | 39,000 |

These maximum forces, $F_1$, are plotted in FIG. 12a where curve B corresponds to $P_o/P_a = 3$, curve D corresponds to $P_o/P_a = 2$, and curve E corresponds to the initially unpressurized $P_o/P_a = 1$.

To calculate the examples represented by FIG. 12b, the following constants were used:

$A = 500$ square inches
$P_a = 14.7$ pounds per square inch
$E_1 = 3,250$ foot-pounds
$F_1 = 24,000$ pounds With these constants $F_1/AP_a = 3.27$.

Using Eq. (4) and $P_o/P_a = 1, 2, 3$, one can calculate the corresponding energy values at the same $X_1/S_o$ values:

| $P_o/P_a$ | 1 | 2 | 3 |
|---|---|---|---|
| $X_1/S_o$ where $F_1/AP_a=3.27$ | .645 | .420 | .225 |
| $E_1/AP_aX_1$ | .97 | 1.86 | 2.55 |
| $X_1$, inches | 5.47 | 2.85 | 2.08 |

These maximum strokes, $X_1$, are plotted in FIG. 12b where curve B corresponds to $P_o/P_a = 3$, curve D corresponds to $P_o/P_a = 2$, and curve E corresponds to the initially unpressurized $P_o/P_a = 1$.

Although the prime applications described for the bumper herein have been for over-the-road vehicles, other applications are readily apparent and still others will occur to those skilled in the art who are designing energy-absorbing apparatus. Other applications include use on truck loading docks and platforms to prevent damage to the docks and trucks using them, on farm machinery not normally traveling over the road (trucks, wagons, tractors), and as fenders on boats and boatdocks, on construction machinery exposed to handling materials such as rocks, and requiring energy-absorption for that purpose, or for contact between two machines as a tractor being used to push a scraper, on fixed installations adjacent to highways including on guard rails, divider strips, traffic islands, signal installations, toll booth structures, and retaining walls, and in industrial plants requiring handling of heavy materials and energy-absorption of carts, dollies, pallets, conveyors and handling vehicles.

While the foregoing has described what are at present considered to be the preferred embodiments of the invention, it will be apparent that various modifications and other embodiments within the scope of the invention will occur to those skilled in the art. Accordingly, it is desired that the scope of the invention be limited by the appended claims only.

What is claimed is:

1. A bumper apparatus for a vehicle comprising:
  (a) a flexible bag structure having a flexible exterior walls forming a cavity for containing a gas compressed under impact to a substantial pressure to absorb the energy of a collision of said vehicle applied over an impact portion of said exterior walls,
  (b) means for attaching said bag structure to a vehicle with said impact wall portion in a generally upright orientation; said bag structure including means for forming said exterior walls to have a certain shape in opposition to said gas pressure so as to limit the stroke of said walls under impact, said exterior wall forming means including load bearing means connected along said exterior walls and between a plurality of spaced fixed parts of said bag attaching means, said load bearing means including flexible webs shaped such that substantially all of the web material is in tension when the flexible cavity is pressurized and having an opening for gas flow past said webs under impact;
  (c) and means for controlling the gas pressure in said bag structure including means for controlling gas flow out of said bag structure upon the application of pressure thereto under impact.

2. The apparatus of claim 1 wherein said flexible bag structure has a flexible section with a closed back, and a rigid section for supporting said flexible section, and said load bearing webs are connected between internal wall portions of said flexible section.

3. The apparatus of claim 1 wherein said flexible bag structure has a flexible section with an open back, and a rigid section for closing said open back and secured to said bag structure attaching means.

4. The apparatus of claim 3 wherein said gas flow controlling means is in said rigid section.

5. The apparatus of claim 3 wherein said rigid section has a substantial volume, and said gas flow controlling means controls gas flow from said flexible section to said rigid section.

6. The bumper apparatus of claim 3 wherein said rigid section supports portions of said protected vehicle.

7. The bumper apparatus of claim 6 wherein said rigid section is combined with said portions of said protected vehicle.

8. The apparatus of claim 1 wherein said gas flow controlling means is in a wall of said bag structure.

9. The apparatus of claim 1 wherein said gas flow controlling means permits exhausting of gas from said flexible bag structure to the atmosphere.

10. The apparatus of claim 9 wherein said gas flow controlling means includes a normally closed relief valve set to open at a predetermined differential pressure.

11. A bumper apparatus for a vehicle as recited in claim 1 and further comprising at least one other flexible bag structure similar to said first mentioned flexible bag structure, said gas pressure controlling means including means for controlling gas flow out of said other bag structure, and said attaching means including means for disposing said bag structures laterally across a vehicle for the protection thereof.

12. The bumper apparatus of claim 1 wherein said gas flow controlling means includes at least one orifice controlling the rate of flow from said flexible bag structure.

13. The apparatus of claim 1 wherein the normal pressure of said gas is substantially greater than atmospheric pressure.

14. The apparatus of claim 13 wherein said pressure controlling means includes means on the vehicle for restoring after impact the gas pressure to a greater than atmospheric pressure.

15. The apparatus of claim 1 wherein the normal pressure of said gas is substantially atmospheric pressure and is substantially increased during impact.

16. A bumper apparatus for attachment to an object to be protected comprising:

a container for a gas compressed under impact to a substantial pressure having a flexible section with a flexible impact wall, a rigid section of substantial volume; and a partition between said flexible and rigid sections;

and means for interconnecting said flexible and rigid sections to permit passage of the compressible gas from the flexible section to the rigid section upon impact; said interconnecting means having means at said partition for controlling the flow of the compressed gas between said flexible and rigid sections, said rigid section including plurality of sub-sections interconnected for passage of gas from said flexible section sequentially through said plurality of sub-sections.

17. A bumper apparatus for a vehicle comprising:

a flexible bag structure for containing gas whose pressure increases under impact to absorb energy applied over an impact surface thereof, means for attaching said bag structure to a vehicle as a bumper;

means for controlling the gas pressure in said bag structure including means for permitting gas flow out of said bag structure upon the application of pressure thereto under impact, and means on the vehicle for restoring after impact the gas pressure to the original pressure;

said bag structure including a plurality of separable compartments along the length thereof formed as separate gas containing units, and said pressure controlling means includes separate means for permitting gas flow out of each of said compartments;

each of said compartments comprising a plurality of sub-compartments interconnected for gas pressure therebetween, said sub-compartments being formed by a plurality of flexible intermediate webs having passageways therethrough and being connected to the inner surface of said bag structure;

said gas flow permitting means controlling exhausting of gas flow from said flexible section to the atmosphere, and including normally closed relief valves set to open at a predetermined differential pressure.

18. The apparatus of claim 17 wherein gas pressure restoring means includes a manifold connected to each of said compartments.

19. The apparatus of claim 17 wherein said bag structure further includes a flexible outer casing for covering said separable compartments.

20. The apparatus of claim 19 wherein said outer casing includes high strength filaments.

* * * * *